(12) United States Patent
Jiang et al.

(10) Patent No.: US 12,401,857 B2
(45) Date of Patent: Aug. 26, 2025

(54) PAGE DISPLAY METHOD AND APPARATUS, COMPUTER DEVICE, STORAGE MEDIUM AND PROGRAM PRODUCT

(71) Applicant: TENCENT TECHNOLOGY (SHENZHEN) COMPANY LIMITED, Guangdong (CN)

(72) Inventors: Xiaolong Jiang, Guangdong (CN); Huiling Li, Guangdong (CN); Zhenni Wu, Guangdong (CN); Xiao Hua, Guangdong (CN); Jun Ge, Guangdong (CN); Che Zang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/605,283

(22) Filed: Mar. 14, 2024

(65) Prior Publication Data

US 2024/0223862 A1    Jul. 4, 2024

Related U.S. Application Data

(63) Continuation of application No. PCT/CN2023/098228, filed on Jun. 5, 2023.

(30) Foreign Application Priority Data

Jun. 30, 2022 (CN) .......................... 202210770529.6

(51) Int. Cl.
*H04N 21/478* (2011.01)
*G06T 7/13* (2017.01)
(Continued)

(52) U.S. Cl.
CPC ......... *H04N 21/47815* (2013.01); *G06T 7/13* (2017.01); *G06T 15/205* (2013.01);
(Continued)

(58) Field of Classification Search
CPC ......... H04N 21/47815; H04N 21/4316; H04N 21/47217; H04N 21/8146; H04N 21/431;
(Continued)

(56) References Cited

U.S. PATENT DOCUMENTS

2014/0309925 A1\* 10/2014 Morato ................ G01C 21/206
701/411
2016/0253844 A1\* 9/2016 Petrovskaya .......... G06Q 50/01
345/633

(Continued)

FOREIGN PATENT DOCUMENTS

CN    113596553 A    11/2021
CN    113691853 A    11/2021

OTHER PUBLICATIONS

International Search Report for PCT/CN2023/098228 dated Sep. 11, 2023.
Written Opinion for PCT/CN2023/098228 dated Sep. 11, 2023.

*Primary Examiner* — Oschta I Montoya
(74) *Attorney, Agent, or Firm* — Sughrue Mion, PLLC

(57) ABSTRACT

A page display method and apparatus. The method includes playing a target video, and during the playing of the target video, displaying, in a viewing angle display panel, a view of a target object from at least one viewing angle based on an object display operation being triggered based on a target video picture of the target video, the target object being an object comprised in the target video picture, and a video picture of the target video comprising at least one object.

16 Claims, 11 Drawing Sheets

(51) Int. Cl.
  *G06T 15/20* (2011.01)
  *G06T 17/00* (2006.01)
  *G06T 19/20* (2011.01)
  *H04N 21/431* (2011.01)
  *H04N 21/472* (2011.01)
  *H04N 21/81* (2011.01)

(52) U.S. Cl.
  CPC .............. *G06T 17/00* (2013.01); *G06T 19/20* (2013.01); *H04N 21/4316* (2013.01); *H04N 21/47217* (2013.01); *H04N 21/8146* (2013.01); *G06T 2200/24* (2013.01); *G06T 2207/10016* (2013.01); *G06T 2219/2016* (2013.01)

(58) Field of Classification Search
  CPC ........... H04N 21/4402; H04N 21/6587; H04N 21/81; G06T 7/13; G06T 15/205; G06T 17/00; G06T 19/20; G06T 2200/24; G06T 2207/10016; G06T 2219/2016
  See application file for complete search history.

(56) References Cited

U.S. PATENT DOCUMENTS

2018/0033193 A1\* 2/2018 Goel ................. G06T 15/04
2024/0303951 A1\* 9/2024 Lombardi ............... G06T 15/06

\* cited by examiner

PAGE DISPLAY METHOD AND APPARATUS, COMPUTER DEVICE, STORAGE MEDIUM AND PROGRAM PRODUCT

CROSS-REFERENCE TO RELATED APPLICATIONS

This application is a continuation application of International Application No. PCT/CN2023/098228 filed on Jun. 5, 2023, which claims priority to Chinese Patent Application No. 202210770529.6, filed with the China National Intellectual Property Administration on Jun. 30, 2022, the disclosures of each being incorporated by reference herein in their entireties.

FIELD

The disclosure relates to the technical field of computer vision, and smart transportation, and in particular, to a page display method and apparatus, a computer device, a storage medium, and a program product.

BACKGROUND

Short videos are video content pushed by video websites frequently and suitable for watching in a mobile state and a short-term leisure state. Playback duration of a short video ranges from a few seconds to a few minutes. A short video playback page may generally include a promotion link, to promote related products to video viewers.

In the related art, after a video viewer taps a promotion link in a short video playback page, a terminal jumps from the short video playback page to a shopping page provided by an e-commerce backend. The video viewer can browse general information about products by tapping product details in the shopping page to further jump to a details page.

SUMMARY

Some embodiments provide a page display method and apparatus, a computer device, a storage medium, and a program product. The technical solutions are as follows.

Some embodiments provide, a page display method including: playing a target video; and during the playing a target video, displaying, in a viewing angle display panel, a view of a target object from at least one viewing angle based on an object display operation being triggered based on a target video picture of the target video, the target object being an object included in the target video picture, and a video picture of the target video including at least one object.

Some embodiments provide a page display apparatus including: at least one memory configured to store program code; and at least one processor configured to read the program code and operate as instructed by the program code, the program code comprising: video playback code configured to cause at least one of the at least one processor to play a target video; and view display module, configured to cause at least one of the at least one processor to: during the playing of the target video, display, in a viewing angle display panel, a view of a target object from at least one viewing angle based on an object display operation being triggered based on a target video picture of the target video, the target object being an object included in the target video picture, and a video picture of the target video including at least one object.

Some embodiments provide a non-transitory computer-readable storage medium storing computer code which, when executed by at least one processor, causes the at least one processor to at least: play a target video; and during the playing of the target video, display, in a viewing angle display panel, a view of a target object from at least one viewing angle based on an object display operation being triggered based on a target video picture of the target video, the target object being an object comprised in the target video picture, and a video picture of the target video comprising at least one object.

In the page display method provided in some embodiments, when a target video is played, if an object display operation triggered based on a target video picture is received, a view of a target object from at least one viewing angle is displayed in a viewing angle display panel, and the target object is an object included in the target video picture. In this way, an operation restriction of obtaining object information only from viewing an object in a video picture is removed, and the object in the video picture can be extracted and presented in different angles according to user operations, so as to provide an effective manner to browse the object, so that users can get what they see, thereby improving efficiency of displaying information of the object in the video picture and interaction efficiency of a user interface. In addition, each video picture in the target video includes at least one object, and a relationship between a video and a displayable object is not limited to one-to-one correspondence, so that a quantity of displayable objects of the video is increased, thereby improving information display efficiency of page display.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C," "A and C" and "all of A, B, and C."

A person skilled in the art may understand that the singular forms "a/an", "one", "said" and "the" used herein may also include the plural forms, unless otherwise expressly stated. The terms such as "comprise" and "include" used in the embodiments of this application means that corresponding features may be implemented as the presented features, information, data, steps, and operations, but do not exclude the implementations of other features, information, data, steps, and operations that are supported by the technical field.

In some embodiments, for any data related to an object such as a video picture published by the object, a view of a target object in the video picture, related information, an outline feature, and information of at least one dimension, when the foregoing embodiments of this application are applied in specific products or technologies, permission or consent of the object needs to be obtained, and the collection, use and processing of the related data shall comply with the relevant laws, regulations, and standards of relevant countries and regions.

Figure 1:
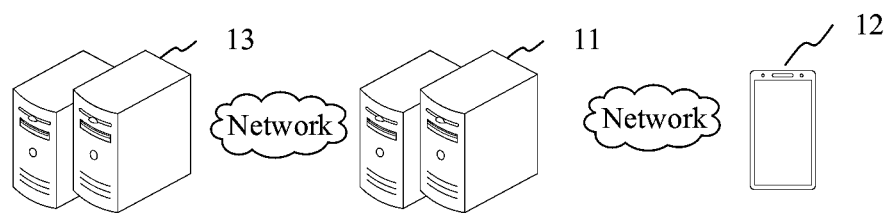
FIG. 1 is a schematic diagram of an implementation environment for implementing a page display method according to some embodiments.

FIG. 1 is a schematic diagram of an implementation environment for a page display method according to some embodiments. As shown in FIG. 1, the implementation environment includes a server 11 and a terminal 12. A target application is installed in the terminal 12, and the server 11 may be a backend server of the target application. The terminal 12 and the server 11 may perform data exchange based on the target application.

The target application has a video playback function. The terminal 12 may receive a video stream sent by the server 11, and play a corresponding video on the target application. In some embodiments, the terminal 12 may display an object of the video from at least one viewing angle in the target application. When the terminal 12 plays the target video, if an object display operation of any video picture is detected, the terminal 12 may send an obtaining request for related information of a target object to the server 11. Based on the obtaining request of the terminal 12, the server 11 returns the related information of the target object to the terminal 12, in some embodiments, information such as a picture, text information, object interaction data, or a permission transfer link. The target object is an object included in any video picture, and each video picture in the target video may include at least one object. The terminal 12 receives the related information of the target object, and displays in a viewing angle display panel a view of the target object from at least one viewing angle based on the related information. The terminal 12 may further display at least one dimension of information of the target object, such as text information, object interaction data, or a permission transfer link, in the viewing angle display panel.

In some embodiments, the target application may further have functions for the target object, such as collecting and permission transfer. As shown in FIG. 1, the implementation environment may further include a server 13. When the terminal 12 initiates a collect request or a permission transfer request for a target object, the server 11 may send the collect request or the permission transfer request to the server 13. The server 13 adds the target object to a corresponding favorites list or implements a process of permission transfer of the target object, based on the collect request or the permission transfer request. In some embodiments, the server 13 may further be configured to provide the related information of the target object. In some embodiments, when receiving the obtaining request of the terminal 12, the server 11 may send the obtaining request to the server 13, and the server 13 returns the related information of the target object to the server 11.

The target application may be any application for playing a video. In some embodiments, the target application may be a live streaming application, a social application, a video application, a game application, a short video application, a content interaction platform, an e-commerce platform, or the like.

The target application may be an independent application, for example, an independent short video application. In some embodiments, the target application may be a plug-in installed in an independent application. In some embodiments, a mini program (sub-program) installed in a social application. The server 11 or the server 13 may be an independent physical server, a server cluster including a plurality of physical servers or a distributed system, or a cloud server or a server cluster that provides basic cloud computing services such as a cloud service, a cloud database, cloud computing, a cloud function, cloud storage, a network service, cloud communication, big data, and an artificial intelligence platform. The terminal may be a smartphone, a tablet, a laptop, a digital broadcast receiver, a desktop computer, a vehicle-mounted terminal (such as a vehicle-mounted navigation terminal or a vehicle-mounted computer), a smart speaker, a smart watch, or the like. The terminal may be directly or indirectly connected to the server via wired or wireless communications. This is not limited herein.

The page display method provided in some embodiments relates to the technology field of computer vision, such as implementing rendering and displaying of a view of a target object from a plurality of viewing angles by using the computer vision technology. The computer vision (CV) technology studies how to use a machine to "see". Furthermore, the computer vision technology uses a camera and a computer to replace human eyes to perform machine vision such as recognition and measurement on a target, and further perform graphic processing on results of the recognition and measurement, so that the computer processes the target into an image more suitable for human eyes to observe or an image transmitted to an instrument for detection. As a scientific discipline, the computer vision technology studies related theories and technologies, and attempts to establish an artificial intelligence system that can obtain information from images or multidimensional data. The computer vision technology generally includes technologies such as image processing, image recognition, image semantic understanding, image retrieval, OCR, video processing, video semantic understanding, video content/behavior recognition, three-dimensional object reconstruction, a 3D technology, virtual reality, augmented reality, synchronous positioning and map construction, autonomous driving, and smart transportation, and further include biological feature recognition technologies such as common face recognition and fingerprint recognition.

Figure 2:
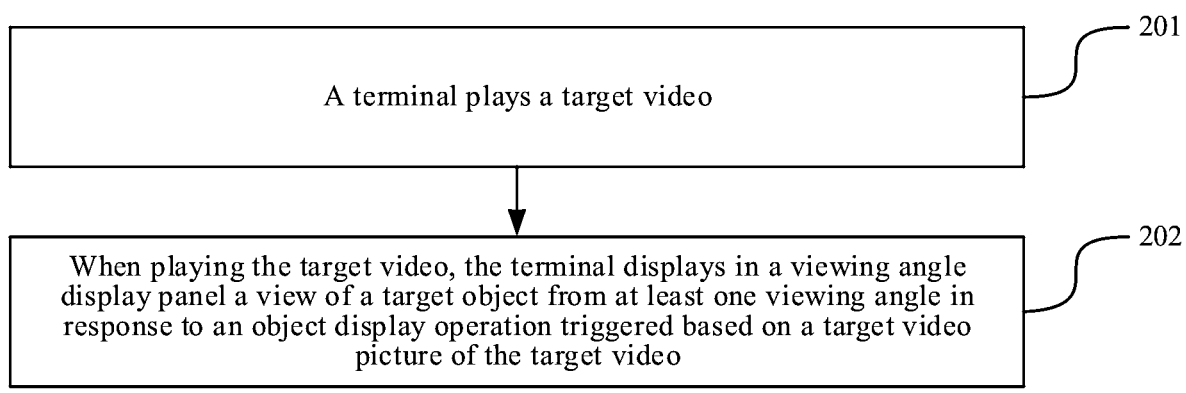
FIG. 2 is a schematic flowchart of a page display method according to some embodiments.

FIG. 2 is a schematic flowchart of a page display method according to some embodiments. The method may be executed by a terminal. As shown in FIG. 2, the method includes the following operations:

Operation 201: The terminal plays a target video.

Each video picture in the target video may include at least one object. The target video may be a video published in a target application. The terminal may play the target video in an application page of the target application. In some embodiments, the target video may be any video that includes at least one object. In some embodiments, the target video may be a video published by a video publisher to share something good in life. In some embodiments, in a scenario that a video publisher cooperates with a merchant to sell products, the target video is a video published by the video publisher to promote and introduce products for promotion. In some embodiments, the target video is a game picture video published by a game player that the game player is playing a game. In some embodiments, a game player may publish a game picture video, and a target object may be virtual game props, virtual game equipment, configured virtual game skins, and the like used by the game player in the game picture video.

In some embodiments, when playing a target picture in the target video, the terminal may display multi-view displaying guidance message in the target video picture. The target video picture may be any video picture in the target video. The multi-view displaying guidance message is used for guiding to trigger multi-view displaying of the target object. In some embodiments, the terminal may display the multi-view displaying guidance message in a first position region of the target video picture. In some embodiments, the first position region may be any position around the target object in the target video picture, such as an upper position, an upper-middle position, and a right-middle position of the target object. In some embodiments, the first position region may, in some embodiments, be a floating window of an upper layer of the target video picture, a sub-page of the target video picture, or the like. In some embodiments, a semi-transparent floating window is displayed in an upper layer of the target video picture, and the multi-view displaying guidance message is displayed in the floating window. An information form of the multi-view displaying guidance message may include a text message, a picture message, an animation, or the like.

Figure 3:
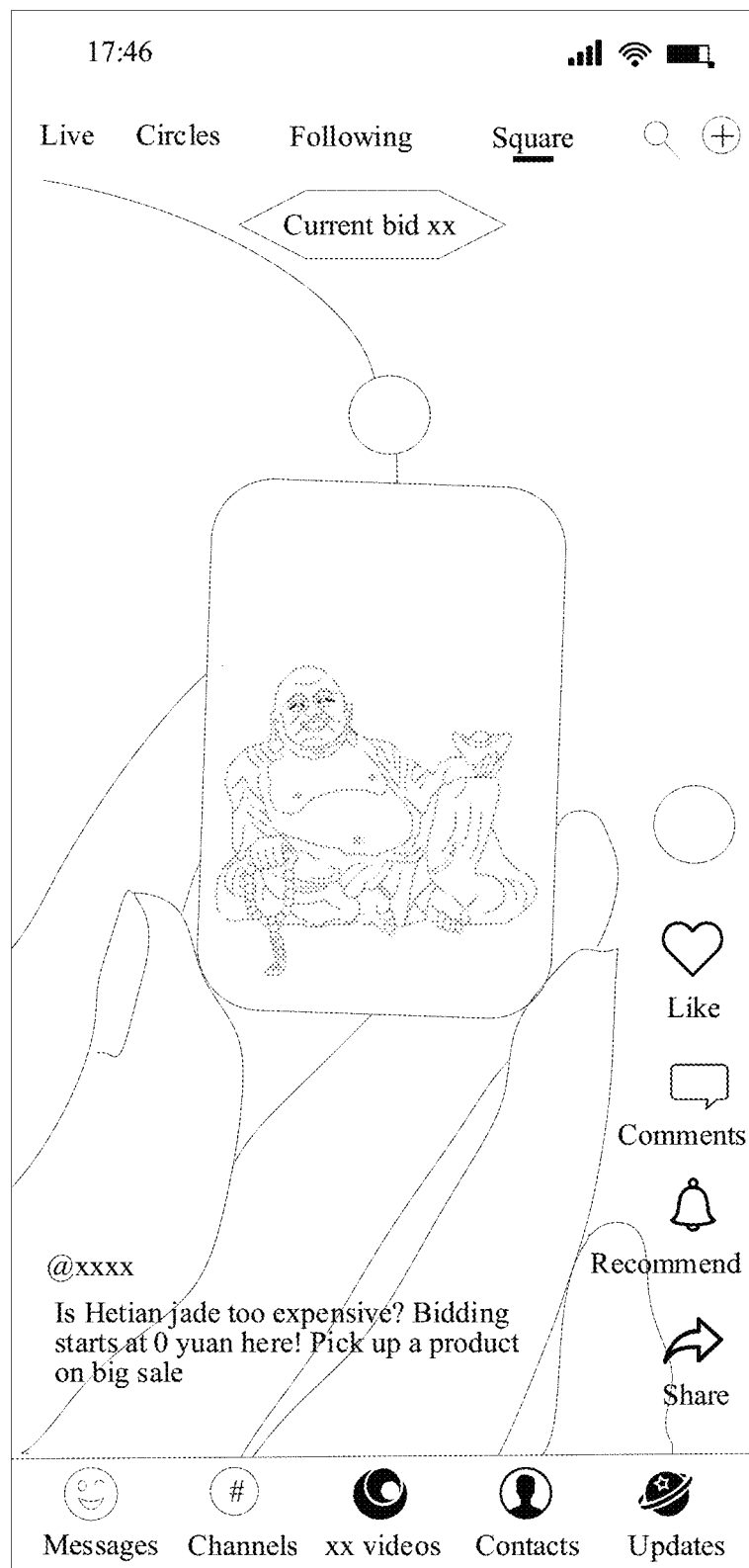
FIG. 3 is a schematic diagram of a page of a video picture according to some embodiments.
Figure 4:
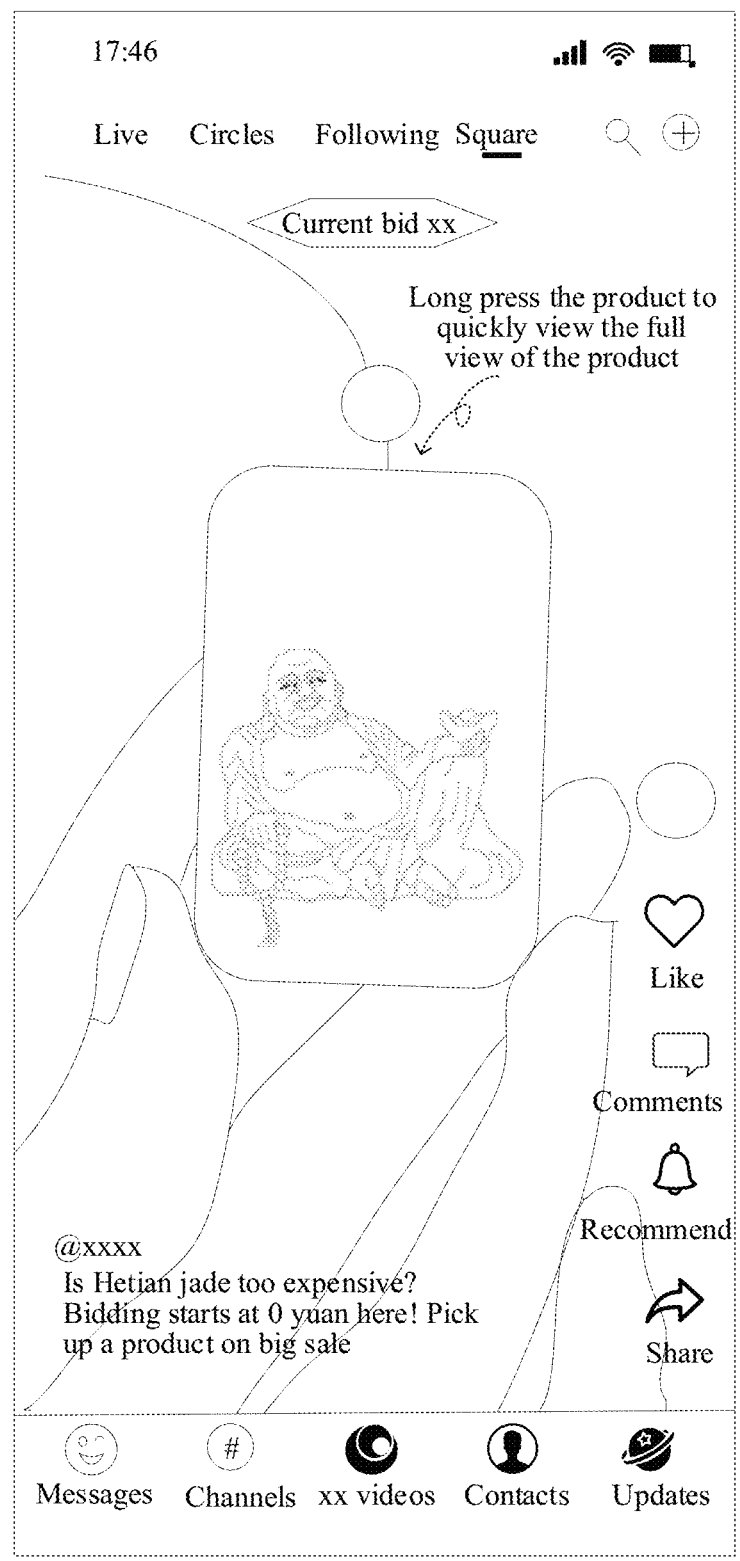
FIG. 4 is a schematic diagram of a page of a video picture according to some embodiments.

As shown in FIG. 3, the terminal displays the target video. When the terminal displays any video picture in the target video, for example, a video picture including a jadeware shown in FIG. 3, the terminal may perform image recognition on the video picture. When it is recognized that the video picture includes an object, for example, a jadeware, the terminal may display a multi-view displaying guidance message of the jadeware on the video picture. As shown in FIG. 4, the terminal may display a multi-view displaying guidance message of "long press the product to quickly view the full view of the product" at an upper-middle position of the jadeware in the video picture, to guide a video viewer to perform an operation according to a prompt to trigger multi-view displaying of the jadeware. The video viewer is a user that views the target video.

In some embodiments, the target video may be a video pre-produced by a video publisher and uploaded to an information publishing platform of the target application. In some embodiments, the video publisher may pre-shoot at least one object to produce a short video (a target video), and publish the short video to a video publishing platform. The video publishing platform may push a video, including the target video, to the video viewer in a form of video stream. The video viewer views the pushed video stream. When viewing a target video with an object of interest, an object display operation on the video picture in the target video may be triggered, to enable the terminal to perform multi-view displaying on at least one object.

In some embodiments, the target video may be a live video streamed in real time by a video publisher. In some embodiments, in a live commerce scenario, a livestreamer may describe details and display usage of products for promotion during the live streaming. When an audience entering a live streaming page view a live video, an object display operation may be triggered, to enable the terminal to perform multi-view displaying on an object of interest of the audience.

Video content of the target video may be a video including any content of at least one object, in some embodiments, a something good sharing video, a product promotion video, a live game video, highlights of game play of a player in a game picture, or a film and television drama video. The video may be a video including at least one video picture in any format, such as any video format including flash animation, MP4, MOV, and AVI.

Operation 202: When playing the target video, the terminal displays in a viewing angle display panel a view of a target object from at least one viewing angle in response to an object display operation triggered based on a target video picture of the target video.

In this operation, each video picture in the target video includes at least one object. The target object is an object included in the target video picture. The target video picture is any video picture in the target video. The object display operation is used for triggering a display process of the target object included in the target video picture. When a video viewer views the target video, if the video viewer is interested in an object of the target video picture, an object display operation on the target video picture may be triggered. In some embodiments, after detecting the object trigger operation, the terminal may display in the viewing angle display panel a view of the target object from at least one viewing angle, that is, a view of the target object displayed in at least one viewing angle. The viewing angle display panel is a panel configured to perform multi-view displaying on the target object. In some embodiments, a 360-degree view of the target object is displayed, or the target object may be displayed in 360-degree. In some embodiments, the viewing angle display panel may be located at an upper layer of a video picture of the target video. The terminal may add a layer in the video picture of the target video, and display a viewing angle display panel in the added layer according to a pre-configured attribute. The pre-configured attribute may be an attribute of a pre-configured viewing angle display panel. The pre-configured attribute may include but is not limited to transparency, a shape, a background image, an area, and the like. In some embodiments, a shape and an area of the viewing angle display panel may be the same as those of the video picture, or the viewing angle display panel may be 50%, 60%, 80%, or any other proportion of an area of the video picture. In some embodiments, the viewing angle display panel is a rectangular panel located at an upper half region, a central region, or the like of the video picture. The background image may be a black or colorless picture without picture content or a background image with picture content. The transparency may be 50%, 35%, 80%, or the like. In some embodiments, the viewing angle display panel may be a black semi-transparent mask that is covered on the upper layer of the video picture and has a same shape and size as those of the video picture. In some embodiments, after detecting the object trigger operation, the terminal may display in the target video picture a view of the target object from at least one viewing angle.

The object display operation is used for triggering a display process of the target object from the at least one viewing angle. In some embodiments, the object display operation may include a first display operation. The first display operation may be a display operation triggered when the target video picture is played. In this case, the display process triggered by the object display operation may include the following operation A1.

Operation A1: The terminal displays in the viewing angle display panel a first view of the target object from a first viewing angle in response to the first display operation.

The terminal displays the viewing angle display panel at an upper layer of the target video picture and displays in the viewing angle display panel the first view of the target object from the first viewing angle, in response to the first display operation. In some embodiments, the first viewing angle may be an initial viewing angle when the target object is displayed in the viewing angle display panel.

In some embodiments, the first viewing angle may be a viewing angle of the target object in a pre-configured video picture. The first viewing angle may be a viewing angle of the target object in a first video picture. In some embodiments, the first viewing angle may be a viewing angle of the target object in a cover image of the target video. In this case, the terminal may obtain the first viewing angle of the target object in the pre-configured video picture, and display in the viewing angle display panel the first view of the target object from the first viewing angle.

In some embodiments, the first viewing angle may be a viewing angle of the target object in a picture where the target object in a server is in. In other words, the terminal may further determine the first viewing angle based on a picture of the target object in a server of the target application. In some embodiments, the first viewing angle may be a viewing angle of the target object in a picture of a target object sending by a server. In some embodiments, the terminal may send an obtaining request to the server based on the object display operation. The server returns related information of the target object to the terminal based on the obtaining request. The related information may include the picture of the target object. The terminal may obtain a first viewing angle of the target object in the picture returned by the server, and display in the viewing angle display panel a first view of the target object from the first viewing angle.

In some embodiments, the first display operation may be an operation triggered based on the target video picture. A specific operation manner of the first display operation may be configured based on needs. In some embodiments, the first display operation may be a long press operation based on the target video picture. In some embodiments, if a video viewer begins to perform a long press operation while the target video picture is played, and duration of the long press reaches two seconds, the first display operation is triggered.

In some embodiments, the terminal may further display a view-changing guidance message for the target object in the viewing angle display panel. The view-changing guidance message is used for guiding the target object in rotating from a viewing angle to another viewing angle. In some embodiments, the terminal may display the view-changing guidance message in a second position region of the viewing angle display panel. An information form of the view-changing guidance message may include a picture, an animation, a text message, and the like. In some embodiments, arrow icons for left and right rotation of the target object are displayed at a left position region and a right position region in the middle of the target object as the view-changing guidance message.

Figure 5:
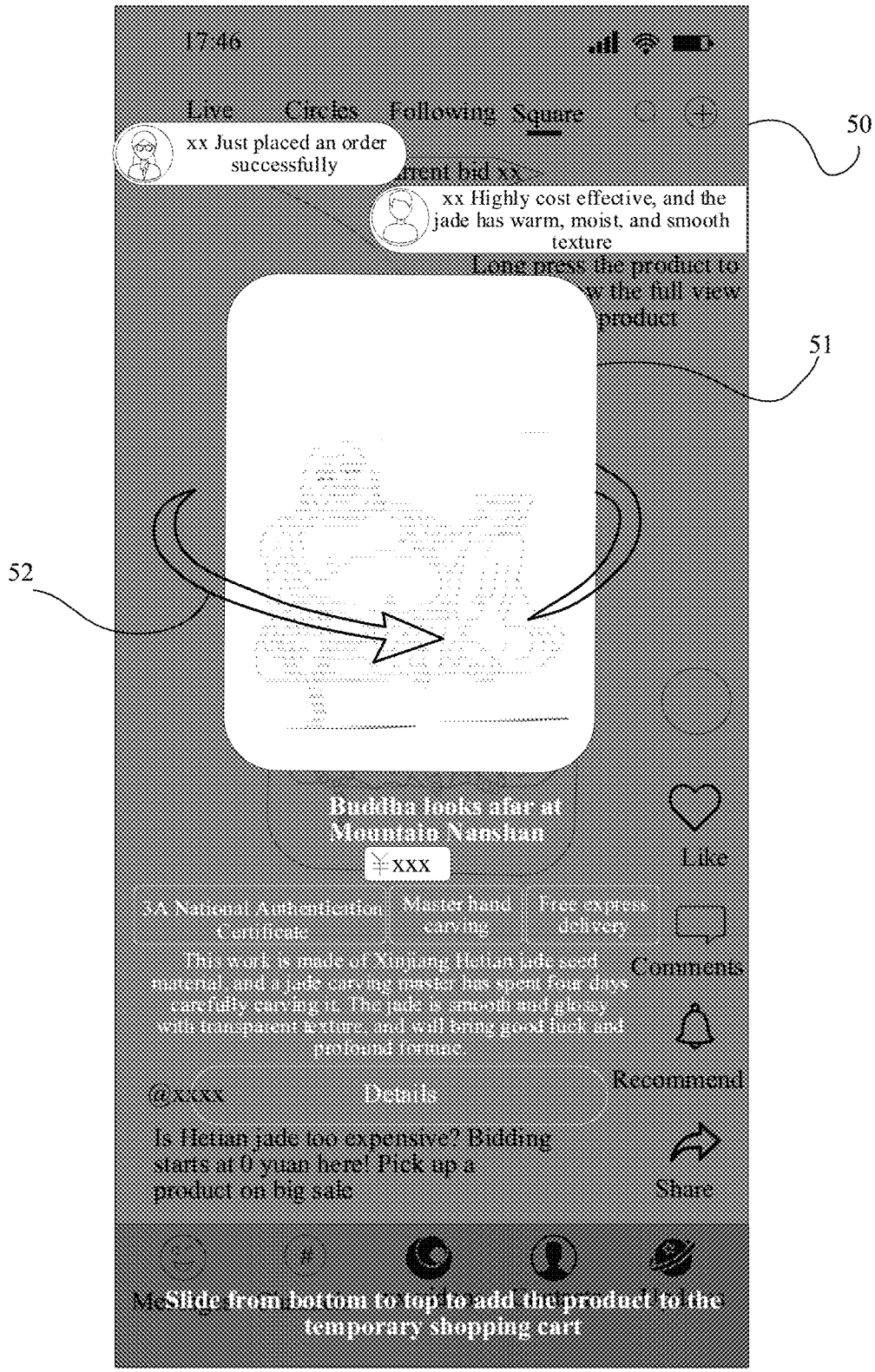
FIG. 5 is a schematic diagram of a page of a viewing angle display panel according to some embodiments.

FIG. 5 is a schematic diagram of a page of a viewing angle display panel according to some embodiments. When the video viewer triggers a long press operation that reaches two seconds on the target video picture, the terminal may display a viewing angle display panel 50 as shown in FIG. 5. As shown in FIG. 5, the viewing angle display panel may display a front view 51 of the jadeware. The terminal may further display a guiding arrow 52 that rotates from left to right around the jadeware.

In some embodiments, the object display operation may include a second display operation. The second display operation may be a display operation triggered in the viewing angle display panel. In this case, the display process triggered by the object display operation may include the following operation A2.

Operation A2: The terminal displays in the viewing angle display panel a process picture of the target object dynamically rotating from the first viewing angle to a second viewing angle and a second view of the target object from the second viewing angle in response to a second display operation.

The second display operation may be an operation triggered in the viewing angle display panel or an operation triggered based on the first view. The second display operation is used for triggering the target object to rotate from a viewing angle to another viewing angle. The second display operation may be an operation that triggers displaying of the target object rotating from any angle from 360 degrees. In some embodiments, the second display operation may be an operation triggered based on a view-changing guidance message in the viewing angle display panel. As shown in FIG. 5, the second display operation may be an operation that the target object rotates from left to right and that is triggered by the guiding arrow from left to right. In some embodiments, the target object is triggered to rotate 90 degrees from left to right. In some embodiments, the second display operation may be an up-and-down rotation operation. In some embodiments, the target object is triggered to rotate 180 degrees from top to down.

The process picture of the dynamic rotation may include an operation track of the target object along the second display operation and a middle view corresponding to a middle viewing angle in a process of the target object gradually rotating from the first viewing angle to the second viewing angle. The middle viewing angle may be a viewing angle transitioning from the first viewing angle to the second viewing angle during the rotation, and an angle of rotating from the first viewing angle to the middle viewing angle is smaller than an angle of rotating from the first viewing angle to the second viewing angle. In some embodiments, if the target object is triggered to rotate 90 degrees from left to right, the middle viewing angle may include any angle smaller than 90 degrees when the target object rotates from left to right, for example, rotates 45 degrees, 60 degrees, 80 degrees, or the like from left to right. The middle view may be a view of the target object from the middle viewing angle. Certainly, the terminal may obtain at least one middle view corresponding to at least one middle viewing angle based on a pre-configured viewing angle gradual-changing granularity. In some embodiments, a current view is a front view of the target object, and the front view is a front image of the target object. As shown in FIG. 5, the viewing angle display panel 50 in FIG. 5 displays a front view 51 viewed from front of the jadeware. In a process that the target object is triggered to rotate 90 degrees from left to right from the front view of the target object, eight middle viewing angles (for example, rotate a middle viewing angle of 10 degrees, 20 degrees, . . . , 70 degrees, 80 degrees, and the like from left to right) may be used to gradually change relative to the middle view, or 100 middle views may be used to achieve a smoother gradual-changing effect.

In some embodiments, if the object trigger operation is detected, the terminal may first slow down the video in response to the trigger operation, and if related information of the object is obtained, the terminal stops playing the video and displays the target object from at least one viewing angle. In some embodiments, an implementation of operation 202 may include the following operation S1 to operation S3.

Operation S1: The terminal plays at least one frame of picture after the target video picture at a first playback speed in response to the object display operation.

The first playback speed is less than a second playback speed during the playing of the target video picture. The target video picture and the at least one frame of picture are continuous frame pictures, and playback time of the at least one frame of picture is later than the target video picture.

In some embodiments, the terminal recognizes a long press operation based on the target video picture. If duration of the long press operation reaches two seconds, the terminal determines the long press operation as an object display operation, and slows down the video by four times. That is, the video is played at 0.25 times the playback speed before the operation. If duration of the long press operation does not reach two seconds, the video is played normally.

The video is slowed down when the object display operation is detected, to provide a rapid response to the object display operation triggered by the user, so that sensitivity of responding to a user operation can be improved. In a process of slowing down the video, the terminal synchronously obtains the related information of the target object through operation S2, to facilitate multi-view displaying of the target object. In a short trigger operation process before the displaying, the video content may also be displayed through slowed-down playback, so that an amount of displayed information can be increased, thereby improving efficiency of displaying information.

Operation S2: In a process of playing the target video at the first playback speed, the terminal stops playing the target video in response to that related information of the target object is obtained.

The related information of the target object includes at least one of a picture, text information, a permission transfer link, or object interaction data of the target object.

In some embodiments, the terminal may obtain the related information of the target object from a server. In some embodiments, the terminal may obtain the related information of the target object from a local cache. Correspondingly, an obtaining manner of the related information of the target object includes the following three manners.

Manner 1: The terminal extracts an outline feature of the target object from the target video picture, sends a first obtaining request to the server based on the outline feature of the target object, and receives the related information of the target object returned by the server based on the first obtaining request.

The first obtaining request is used for obtaining related information of an object matching an image outline represented by the outline feature.

The first obtaining request carries the outline feature. The outline feature indicates an outline structure of the target object, for example, a line that outlines a shape of the target object. In some embodiments, the outline feature may be represented as a form of a feature map. The outline feature may be a binary outline feature map. In some embodiments, a value of an outline pixel point of the target object of the outline feature map is 1, and a value of another non-outline pixel point is 0. The outline pixel point may be a pixel point that forms a shape line and an outline of the target object. The non-outline pixel point may be a pixel point other than the shape line and the outline of the target object.

In this operation, the terminal may extract a key frame picture of the target video picture from the target video, and performs image recognition on the key frame picture, to recognize an outline of a target object in the key frame picture to obtain an outline feature of the target object. In some embodiments, the terminal may perform binary processing on the key frame based on the outline of the target object, to obtain an example binary outline feature map. The key picture may be a picture that is in a neighborhood picture set of the target video picture and that matches a pre-configured picture condition. The pre-configured picture condition may include but is not limited to highest resolution, highest color saturation, highest brightness, and the like. The neighborhood picture set may include at least one video picture with playing time in a neighborhood period of time corresponding to a timestamp of the target video picture. The neighborhood period of time corresponding to the timestamp may be a period of time centered on the timestamp and not exceeding a specific threshold. If the timestamp of the target video picture is two seconds, the neighborhood picture set may include video pictures from the first second to the third second.

The terminal may select a picture with high resolution or high brightness from the neighborhood picture set to perform feature extraction, to improve precision of an outline feature, thereby improving accuracy of subsequent matching.

The terminal may generate, based on the outline feature, a first obtaining request carrying the outline feature, and send the first obtaining request to the server. In some embodiments, the terminal may perform data compression on the outline feature map, encapsulate a compressed outline feature map to a data packet corresponding to the first obtaining request, and transmit the packet to the server via a network.

In some embodiments, the terminal may further send an obtaining request to the server based on an operation position of the object trigger operation. In some embodiments, the target video picture may include at least one object, and the terminal may locate a target object with a display requirement based on an operation position of a video viewer. In this case, the operation may include: The terminal obtains an operation position of the object trigger operation in the target video picture, extracts, based on the operation position, an outline feature of the target object in the at least one object included in the target video picture, and sends a first obtaining request to the server based on the outline feature of the target object. In some embodiments, the terminal may perform image recognition on the target video picture, to recognize the at least one object included in the target video picture, and determine a target object located at the operation position from the at least one object based on the operation position and a region position at which the at least one object is located. Then, the terminal extracts the outline feature of the target object in a targeted manner.

Manner 2: The terminal sends a second obtaining request to the server based on video publishing information of the target video, and receives the related information of the target object returned by the server based on the second obtaining request.

The second obtaining request is used for obtaining related information of an object associated with the video publishing information. The second obtaining request carries the video publishing information.

In this operation, the video publishing information may include at least one of information of a video publisher, a timestamp, or a video identification of the target video picture. The video identification may be a video ID. The terminal may generate a second obtaining request carrying the video publishing information based on the video publishing information.

In some embodiments, when the target video picture includes at least one object, the terminal may send an obtaining request to the server based on an operation position of a video viewer. In some embodiments, the terminal obtains the video publishing information of the target video, generates the second obtaining request based on an operation position of a detected object trigger operation and the video publishing information, and sends the second obtaining request to the server. The second obtaining request may carry the video publishing information and the operation position of an object display operation.

In the Manner 1 or the Manner 2, position coordinates of an image coordinate system may be used for identifying the operation position. The operation position may be position coordinates of a center point triggered by the object display operation or a pixel point region triggered by the object display operation. In some embodiments, the operation position may be pixel point coordinates of a triggered pixel point in a two-dimensional image coordinate system of the target video picture. The pixel point coordinates may include coordinates of a center pixel point of the triggered position or a coordinate region of a plurality of pixel points of the triggered region.

Manner 3: The terminal obtains the related information of the target object from a target storage address of the terminal based on a video identification of the target video.

The terminal may pre-store related information of a plurality of objects, including the related information of the target object. In some embodiments, for a video viewed returned to view, a video viewer has viewed conditions of the target object in the video. The terminal may read related information of an object in the viewed video from a cache.

Operation S3: The terminal displays in the viewing angle display panel a view of the target object from at least one viewing angle and at least one dimension of information of the target object based on the related information of the target object.

The at least one dimension of information includes at least one of text information, a permission transfer link, or object interaction data of the target object. In some embodiments, the text information may be text description information for the target object, including an object name, a resource value, a text label of the object, and the like. The permission transfer link may be a website link of a permission transfer page, for example, a shopping link of the target object in an e-commerce platform. The object interaction data may include but is not limited to object comment data, object like data, object dislike data, object permission transfer operation data, and the like. The object interaction data may be data fed back by an interaction object interacting with the target object. The interaction object may be a user who views, purchases, likes, dislikes, or makes comments on the target object, such as a video viewer, a user who purchases the target object, or a user who makes comments. In some embodiments, the object interaction data may include comment data published by a user purchasing the target object, like data, dislike data, or the like fed back after a user purchases the target object or views the target video. The object interaction data may, in some embodiments, include behavior data of a user purchasing the target object. In some embodiments, an on-screen comment "user xx has purchased the jadeware" is displayed in the viewing angle display panel through scrolling.

As shown in FIG. 5, the terminal may display in the viewing angle display panel a view of the target object from at least one viewing angle, and may further display text description of the target object, and display the object interaction data such as object comment data, and object purchase data in a form of on-screen comment through scrolling. The terminal may further display a details button. A video viewer triggers the details button to jump to display a permission transfer page based on the permission transfer link.

Figure 6:
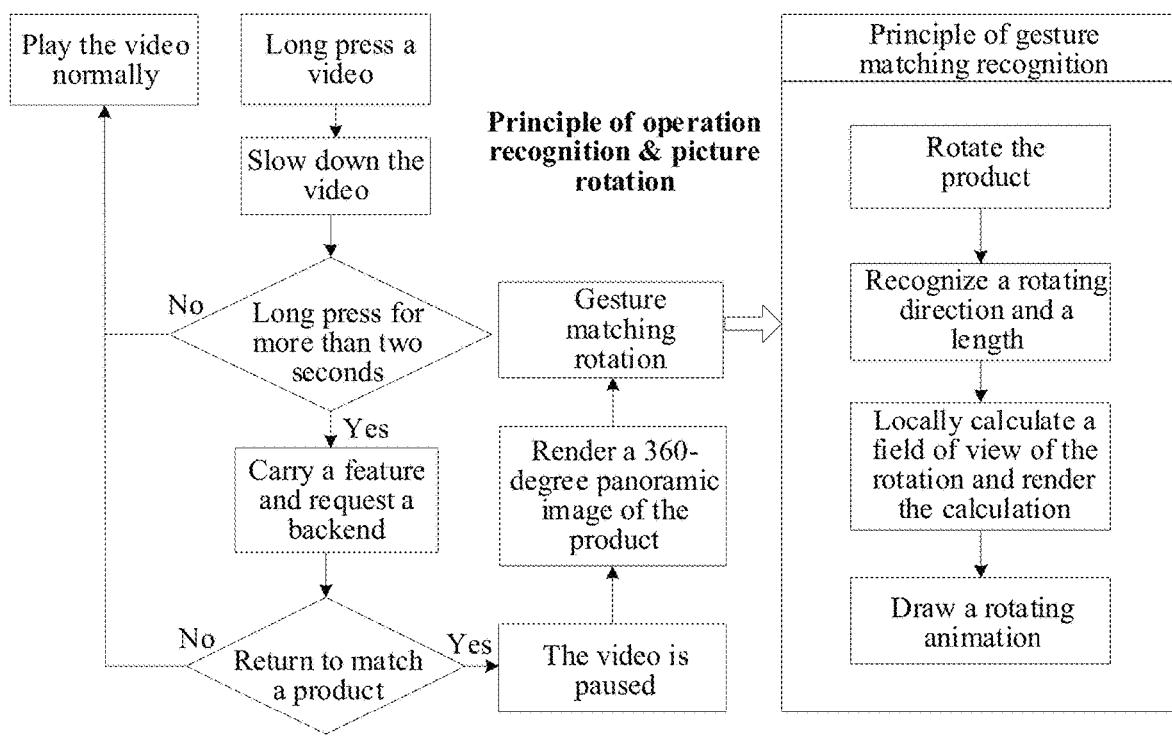
FIG. 6 is a schematic flowchart of page display according to some embodiments.

FIG. 6 is a schematic flowchart of page display according to some embodiments. As shown in FIG. 6, a terminal recognizes a long press operation (which is long pressing the video) of a video viewer based on a video picture of a target video (a target video picture), and starts to slow down the target video. When the video viewer long presses the target video for two seconds, the long press operation is determined as an object display operation. In some embodiments, the video viewer may enter a product promotion scenario in this case. If duration of the long press operation of the video viewer does not reach two seconds, the target video is played normally. If the duration reaches two seconds, the terminal continues to slow down the target video by four times, and extracts a key frame of a neighborhood of the target video picture. After feature information extraction, compression, and network transmission are performed on a product (a target object), the terminal sends an obtaining request carrying an outline feature of the product to a backend, and obtains product details matching the product. If the terminal does not obtain the matching product details, the target video reverts to play at a normal speed. If the terminal obtains the matching product details, the target video is paused, and a 360-degree panoramic image of the product is rendered to display. In some embodiments, a three-dimensional space model of the product is displayed in a viewing angle display panel in an enlarged form (for example, gradually enlarged based on the target object in the video picture of the target video). If a multi-view rotation display operation on the product in the viewing angle display panel triggered by a gesture is detected, multi-view displaying is performed on the product based on a rotation operation matching the gesture. When the video viewer manually rotates the product by a gesture in the viewing angle display panel, a rotating direction, a rotating angle, an operation length, a force, and the like of the video viewer gesture for the product are recognized. The terminal performs calculation on a rotating field of view and rendering data of the product based on a recognition result. In some embodiments, the terminal calculates in real-time a picture rendering result of the product in a field of view from a second viewing angle, and draw a rotating animation, to implement 360-degree rotating displaying of the product.

In some embodiments, the video viewer may further cancel a multi-view displaying process for the target object in the viewing angle display panel. In some embodiments, a process of canceling the multi-view displaying may include: The terminal cancels displaying of the viewing angle display panel and continues to display the target video at the second playback speed, in response to a display cancellation operation triggered for the viewing angle display panel. In some embodiments, when the video viewer triggers a display cancellation operation in the viewing angle display panel, the terminal may revert the playback speed to a playback speed before the object display operation, to continue to play the target video at a position at which the target video is paused due to displaying the target object in the viewing angle display panel. An operation manner of the display cancellation operation may be triggering any position of a non-functional region in the viewing angle display panel, for example, an operation to trigger a free region in the viewing angle display panel other than various information and views.

In some embodiments, the video viewer may further trigger a collect operation on the target object in the viewing angle display panel. In this case, the terminal sends a collect request for the target object to a server and displays an updated favorites list returned by the server based on the collect request, in response to a collect operation on the target object. The updated favorites list includes at least the target object. A favorites list includes one or more objects collected by the video viewer. The video viewer is a user that views the target video. The updated favorites list is obtained by updating the favorites list based on collect operation. In some embodiments, after detecting that the collect operation is trigged on the target object, the terminal initiates a collect request for the target object to the server. The server adds the target object to an existing favorites list based on the collect request, to obtain the updated favorites list. The collect operation may trigger to collect the target object to the favorites list of the video viewer. The updated favorites list may be a list displaying information such as pictures, texts, and a quantity of collections of each object including the target object. The updated favorites list may be represented as, for example, a personal favorites page, and a temporary shopping cart. In some embodiments, the terminal may display the updated favorites list in the viewing angle display panel, or display the updated favorites list in an application page when the video viewer triggers a favorites list display operation.

In some embodiments, the video viewer may further trigger a permission transfer process for the target object in the viewing angle display panel. In this case, the terminal jumps from the viewing angle display panel to display a permission transfer page of the target object in response to a permission transfer operation on the target object. The permission transfer page is used for initiating permission transfer of the target object. In some embodiments, the permission transfer operation is used for triggering to display the permission transfer page. In some embodiments, the permission transfer may be a permission to transfer ownership, a permission, and the like of the target object or an object with a same attribute as the target object. In some embodiments, the permission transfer page may be a page to jump to purchase a product. In some embodiments, as shown in FIG. 5, a "details" button may be provided in the viewing angle display panel, and triggering the button may trigger the terminal to jump to a permission transfer page corresponding to the permission transfer link. The permission transfer page is used for initiating permission transfer of the target object. In some embodiments, the terminal may jump from the viewing angle display panel to display a purchasing page of a target product.

In operation 202, after detecting the object display operation, the terminal may construct a three-dimensional model based on an image of the target object, and display a view of the target object from at least one viewing angle based on the three-dimensional model. In some embodiments, the operation 202 may include: The terminal constructs a three-dimensional space model of the target object based on a vertex position and texture data of the target object in a two-dimensional image in response to the object display operation. The two-dimensional image is the target video picture. The terminal displays in the viewing angle display panel a view of the three-dimensional space model from at least one viewing angle.

The two-dimensional image includes the target object. The vertex position may include position coordinates of each vertex of the target object in an image coordinate system. The texture data may include a pixel value of each pixel point and light and shadow data of the target object.

In some embodiments, the terminal performs image recognition on the two-dimensional image, to obtain the texture data of the target object and two-dimensional coordinates of each vertex of the target object in the image coordinate system of the two-dimensional image. In addition, the terminal determines field of view coordinates of the target object based on a transformation relationship between the image coordinate system and a camera coordinate system. The field of view coordinates may also be referred to as camera coordinates, which indicates a viewing angle of the target object in the two-dimensional image. In some embodiments, the two-dimensional image may be a view from any viewing angle of the target object, such as a front view and a top view. The terminal determines three-dimensional coordinates of each vertex of the target object in a world coordinate system based on the two-dimensional coordinates of each vertex of the target object and a transformation relationship between the image coordinate system, and the world coordinate system. The terminal constructs the three-dimensional space model of the target object based on the three-dimensional coordinates of each vertex of the target object. The three-dimensional space model indicates an object structure of the target object in a three-dimensional space. The terminal may, in some embodiments, combine the texture data to obtain the three-dimensional space model. In this case, the three-dimensional space model may, in some embodiments, indicate a structure, a color, light and shadow, and the like of the target object in the three-dimensional space.

In some embodiments, if the object display operation includes a first display operation, the terminal displays in the viewing angle display panel a first view of the three-dimensional space model from a first viewing angle. In some embodiments, the terminal determines the first view of the three-dimensional space model of the target object from the first viewing angle according to the field of view coordinates of the target object, the three-dimensional coordinates of each point in the three-dimensional space model, and the texture data of the target object. The first viewing angle may be a viewing angle corresponding to the field of view coordinates of the target object. The terminal may display in the viewing angle display panel the first view of the target object from the first viewing angle based on coordinates of a vertex of the target object in the target video picture in response to the first display operation triggered based on the target video picture. The first viewing angle of the three-dimensional space model corresponds to the viewing angle of the target object in the target video picture. The first view may be an image having a three-dimensional effect. In some embodiments, the terminal may render, based on the texture data such as the light and shadow data, and an RGB value of each pixel point, a first view having shadows and a three-dimensional effect in the viewing angle display panel.

In some embodiments, if the object display operation includes a second display operation, the terminal determines a conversion matrix based on the first view and a rotating angle and a moving distance of the second display operation, and displays in the viewing angle display panel a three-dimensional rotation process picture of the three-dimensional space model dynamically rotating from the first viewing angle to a second viewing angle and a second view of the three-dimensional space model from the second viewing angle based on the three-dimensional space model and the conversion matrix.

In this operation, the terminal may determine the second view of the three-dimensional space model of the target object from the second viewing angle based on operation information of the second display operation and the first viewing angle. In some embodiments, the operation information may include a moving distance and a rotating angle. The terminal may determine a moving matrix and a rotation matrix based on the moving distance and the rotating angle of the second display operation, and obtain the second view based on the moving matrix, the rotation matrix and the first view.

In some embodiments, the terminal maps the moving distance of the second display operation to a direction of each coordinate axis of the world coordinate system, to obtain a translation distance of the three-dimensional space model of the target object from the first viewing angle in each coordinate axis direction.

In some embodiments, the terminal may obtain, by calculating based on the following Formula 1, a position of each vertex after the three-dimensional space model of the target object moves based on the moving distance:

$$\begin{bmatrix} 1 & 0 & 0 & T_x \\ 0 & 1 & 0 & T_y \\ 0 & 0 & 1 & T_z \\ 0 & 0 & 0 & 1 \end{bmatrix} \cdot \begin{pmatrix} x \\ y \\ z \\ 1 \end{pmatrix} = \begin{pmatrix} x + T_x \\ y + T_y \\ z + T_z \\ 1 \end{pmatrix}. \quad \text{Formula 1}$$

(x, y, z) represents a vertex position of the three-dimensional space model of the target object in the first view, such as a coordinate position of each vertex of the three-dimensional space model of the target object in the world coordinate system. $T_1$ is a moving distance in an x axis direction of the world coordinate system, $T_2$ is a moving distance in a y axis direction, and $T_3$ is a moving distance in a z axis direction.

In some embodiments, the terminal may map the rotating angle of the second display operation to a rotating angle around each coordinate axis of the world coordinate system, to obtain a rotating angle of the three-dimensional space model of the target object around each coordinate axis direction. In some embodiments, the terminal may obtain, by calculating based on the following Formula 2, a position of each vertex after the three-dimensional space model of the target object from the first viewing angle rotates around an x axis:

$$\begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix} \cdot \begin{pmatrix} x \\ y \\ z \\ 1 \end{pmatrix} = \begin{pmatrix} x \\ \cos\theta \cdot y - \sin\theta \cdot z \\ \sin\theta \cdot y + \cos\theta \cdot z \\ 1 \end{pmatrix}. \quad \text{Formula 2}$$

In Formula 2, $\theta$ is a rotating angle around the x axis. (x, y, z) represents a vertex position of the three-dimensional space model of the target object in the first view.

In some embodiments, the terminal may obtain, by calculating based on the following Formula 3, a position of each vertex after the three-dimensional space model of the target object from the first viewing angle rotates around a y axis:

$$\begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix} \cdot \begin{pmatrix} x \\ y \\ z \\ 1 \end{pmatrix} = \begin{pmatrix} \cos\theta \cdot x + \sin\theta \cdot z \\ y \\ -\sin\theta \cdot x + \cos\theta \cdot z \\ 1 \end{pmatrix}. \quad \text{Formula 3}$$

In Formula 3, $\theta$ is a rotating angle around the y axis, and (x, y, z) is a vertex position of the three-dimensional space model of the target object in the first view.

In some embodiments, the terminal may obtain, by calculating based on the following Formula 4, a position of each vertex after the three-dimensional space model of the target object from the first viewing angle rotates around a z axis:

$$\begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \cdot \begin{pmatrix} x \\ y \\ z \\ 1 \end{pmatrix} = \begin{pmatrix} \cos\theta \cdot x - \sin\theta \cdot y \\ \sin\theta \cdot x + \cos\theta \cdot y \\ z \\ 1 \end{pmatrix}. \quad \text{Formula 4}$$

In Formula 4, $\theta$ is a rotating angle around the z axis, and (x, y, z) is a vertex position of the three-dimensional space model of the target object in the first view.

Based on the foregoing Formula 2 to Formula 4, it can obtain that if vertex information of the three-dimensional space model of the target object in the first view is (x, y, z), a rotation matrix for the three-dimensional space model of the target object from the first viewing angle rotating around any rotating axis ($R_x$, $R_y$, $R_z$) may be represented as:

$$\begin{bmatrix} \cos\theta + R_x^2(1-\cos\theta) & R_xR_y(1-\cos\theta) - R_z\sin\theta & R_xR_z(1-\cos\theta) + R_y\sin\theta & 0 \\ R_yR_x(1-\cos\theta) + R_z\sin\theta & \cos\theta + R_y^2(1-\cos\theta) & R_yR_z(1-\cos\theta) - R_x\sin\theta & 0 \\ R_zR_x(1-\cos\theta) - R_y\sin\theta & R_zR_y(1-\cos\theta) + R_x\sin\theta & \cos\theta + R_z^2(1-\cos\theta) & 0 \\ 0 & 0 & 0 & 1 \end{bmatrix}.$$

The terminal performs rotating process and moving processing on the three-dimensional space model of the target object from the first viewing angle based on the rotation matrix and the moving matrix, to obtain the second view of the three-dimensional space model from the second viewing angle.

In some embodiments, the video viewer may further perform zoom operation on the three-dimensional space model of the target object in the viewing angle display panel, and the operation information may further include a zoom ratio. In some embodiments, the terminal may obtain, by calculating based on the following Formula 5, a position of each vertex after the target object in the first view is zoomed:

$$\begin{bmatrix} S_1 & 0 & 0 & 0 \\ 0 & S_2 & 0 & 0 \\ 0 & 0 & S_3 & 0 \\ 0 & 0 & 0 & 1 \end{bmatrix} \cdot \begin{pmatrix} x \\ y \\ z \\ 1 \end{pmatrix} = \begin{pmatrix} S_1 \cdot x \\ S_2 \cdot y \\ S_3 \cdot z \\ 1 \end{pmatrix}. \quad \text{Formula 5}$$

$S_1$ is a zoom ratio of an x axis, $S_2$ is a zoom ratio of a y axis, $S_3$ is a zoom ratio of a z axis, and (x, y, z) represents a vertex position of the target object in the first view.

In some embodiments, the operation information may further include a press force. The press force may be used for indicating a speed of the target object rotating from the first viewing angle to the second viewing angle. In some embodiments, a greater touch force indicates a higher speed of the target object rotating from the first viewing angle to the second viewing angle. In this case, based on at least one of the moving distance, the rotating angle, the zoom ratio, and the press force, the terminal may display in the viewing angle display panel the three-dimensional rotation process picture of the three-dimensional space model dynamically rotating from the first viewing angle to the second viewing angle and the second view of the three-dimensional space model from the second viewing angle.

Figure 7:
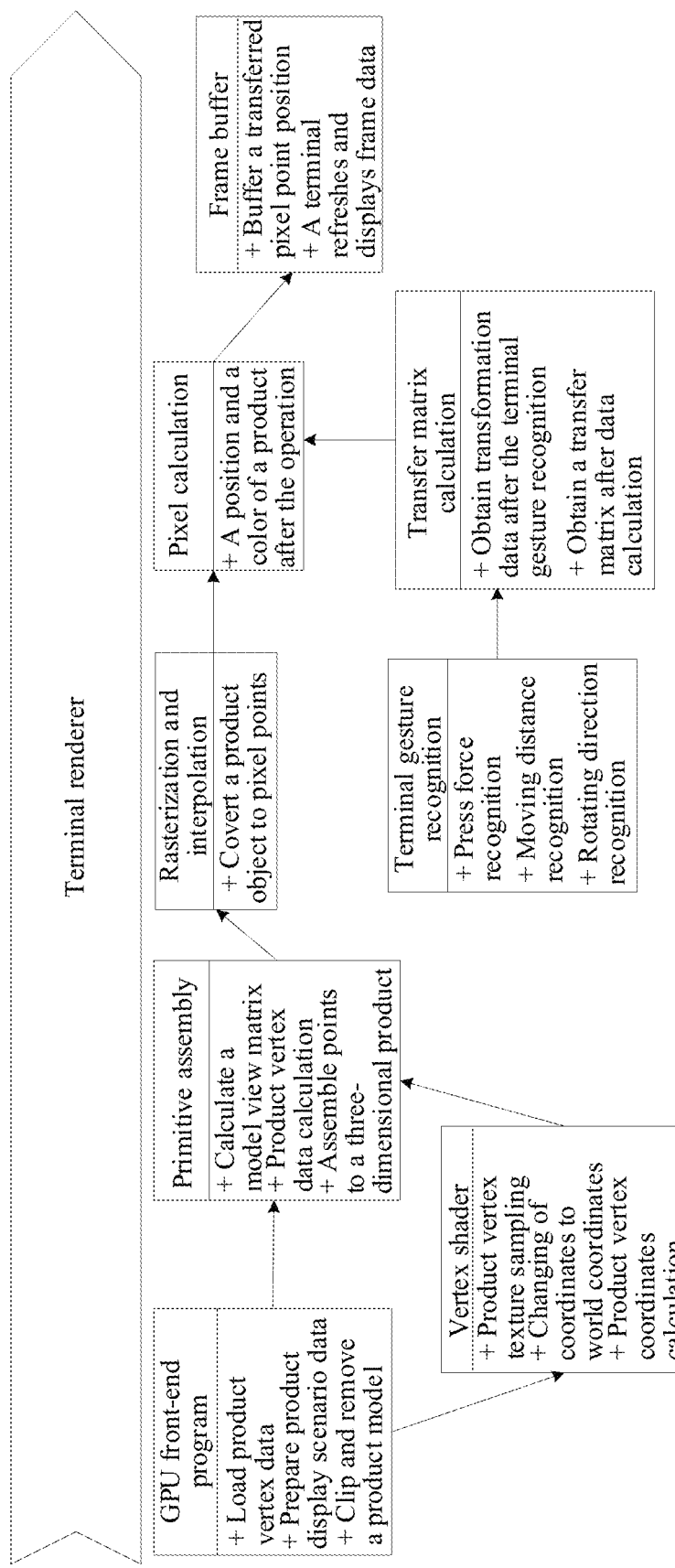
FIG. 7 is a schematic diagram of an image rendering process according to some embodiments.

FIG. 7 is a schematic diagram of an image rendering process according to some embodiments. As shown in FIG. 7, first, a terminal determines a vertex position and texture data of a product based on a two-dimensional image of the product (a target object). The vertex position may be two-dimensional coordinates of the product in a two-dimensional image coordinate system. The terminal clips and removes redundant points and error points of the product in a two-dimensional model, and obtains background display scenario data of the product. The terminal may pre-obtain and store the vertex position and the texture data, and load the vertex position and the texture data from an internal memory via a GPU front-end program. Next, the terminal performs texture sampling on a vertex of the product by using a vertex shader, and maps two-dimensional coordinates of the vertex to corresponding three-dimensional coordinates in a world coordinate system. Then the terminal calculates a view matrix by using a primitive assembler, calculates texture data and scenario information of the vertex of the product in the world coordinate system, and obtains a three-dimensional space model of the product by assembling each point. Then the terminal performs a rasterization and interpolation operation on the three-dimensional space model, to smoothen displaying and a shadow effect of the product. When a second display operation in a viewing angle display panel is detected, the terminal performs press force recognition, moving distance recognition, and rotating direction recognition on the second display operation, to recognize a gesture operation to obtain transformation data such as a press force, a rotating angle, and a moving distance. Then the terminal performs pixel calculation. The terminal calculates a position and a color of the product after the second display operation according to the foregoing obtained three-dimensional space model and a transfer matrix, to obtain new pixel point information of the product, that is, information of a transferred pixel point. Finally, the terminal performs frame buffer and frame refresh on the information of the transferred pixel point. The frame buffer is to buffer the information of the transferred pixel point, for example, to load a pixel point position and a pixel point RGB value after the transfer to a buffer. The frame refresh is to refresh to-be-displayed frame picture data based on the buffered pixel point information, to display a frame picture corresponding to new frame picture data, and to display in the viewing angle display panel a second view of the product from a second viewing angle.

In related technologies, in a display process of a video page for displaying a product, it is needed to trigger a plurality of page jumps to learn overall information of the product. The cumbersome operation process leads to a low information display efficiency of page display. In addition, in related technologies, product purchasing behavior and video viewing behavior are independent from each other, so that a video viewer is difficult to quickly make a purchase after a video in just tens of seconds ends. In addition, promotion links displaying an object in high density are easy to cause cognitive fatigue to the video viewer. In addition, if an object of a historically viewed video is missed, it is needed to go back to the historically viewed video to find a corresponding promotion link of the object to purchase the object. However, intensive viewing operations increase difficulty of locating historical videos, resulting in ease of losing these historical visiting videos. In some embodiments, based on a cognitive habit of "what you see is what you get", in a short video, a video viewer can directly recognize a product in the video. The video viewer can conveniently view a panoramic view of the product through a gesture operation, and easily collect the product into a temporary shopping bag through a collect operation in the viewing angle display panel. Such an operation manner changes separation between products and short video content, and improves interactivity between videos and viewers.

In addition, in related technologies, product promotion links are bound to short video content in one-to-one association, and one short video is bound to one promotion link. After a video publisher finishes a short video, a related promotion link has been bound to the video, so that one video only promotes one product. In other words, a quantity of products that can be promoted by each short video is limited. For merchants, a quantity of promoted products per video is limited and a quantity of promoted products is small. Generally, one video promotes one product, resulting in low advertising exposure and a conversion rate.

In the page display method provided in some embodiments, when a target video picture of a target video is played, an object display operation triggered based on the target video picture is received, a view of a target object from at least one viewing angle is displayed in a viewing angle display panel, and the target object is an object included in the target video picture. In this way, an operation restriction of obtaining object information only from viewing an object in a video picture is removed, and the object in the video picture can be extracted and presented in different angles according to user operations, so as to provide an effective manner to browse the object, so that users to get what they see, thereby improving efficiency of displaying information of the object in the video picture and interaction efficiency of a user interface. In addition, each video picture in the target video includes at least one object, and a relationship between a video and a displayable object is not limited to one-to-one correspondence, so that a quantity of displayable objects of the video is increased, thereby improving information display efficiency of page display.

Figure 8:
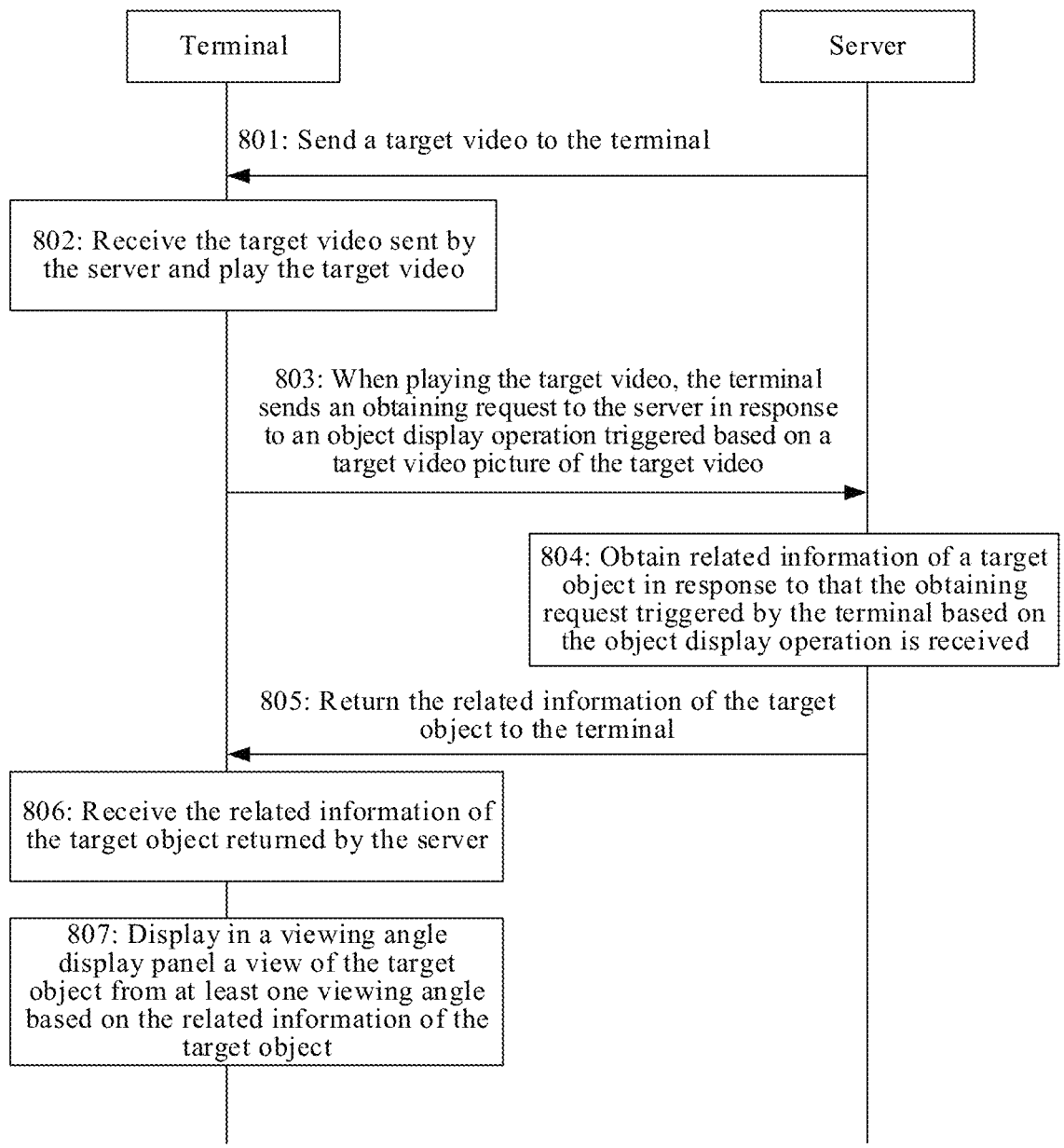
FIG. 8 is a schematic diagram of signaling interaction of a page display method according to some embodiments.

FIG. 8 is a schematic diagram of signaling interaction of a page display method according to some embodiments. The method may be interactively performed by a terminal and a server. As shown in FIG. 8, the method includes the following operations:

Operation 801: The server sends a target video to the terminal.

The target video may be a video in a target application. The server is a backend server of the target application, and the server may send the target video to the terminal.

In some embodiments, the target video is a video on a video publishing platform of the target application. The server may push at least one video to the terminal in a manner of pushing a video stream, and the at least one video includes the target video. In some embodiments, the target video may be a live video stream of the target application. The server may send a live video stream of a live streaming of the video publisher to the terminal.

Operation 802: The terminal receives the target video sent by the server and plays the target video.

The terminal plays each video picture of the target video in an application page of the target application. Each video picture in the target video may include at least one object.

Operation 803: When playing the target video, the terminal sends an obtaining request to the server in response to an object display operation triggered based on a target video picture of the target video.

The obtaining request is used for requesting to obtain related information of a target object. The object display operation is an operation triggered based on the target video picture of the target video. The target object is an object included in the target video picture. The target video picture is any video picture in the target video.

In some embodiments, the terminal may send the obtaining request to the server based on a feature of the target object. In another example, the terminal may send the obtaining request based on video publishing information of the target video. Correspondingly, manners of the terminal sending the obtaining request including the following two manners.

Manner 1: The terminal extracts an outline feature of the target object from the target video picture, and sends a first obtaining request to the server based on the outline feature of the target object.

The first obtaining request is used for obtaining related information of an object matching an image outline represented by the outline feature. The first obtaining request carries the outline feature of the target object.

Manner 2: The terminal sends a second obtaining request to the server based on the video publishing information of the target video.

The second obtaining request is used for obtaining related information of an object associated with the video publishing information. The second obtaining request carries the video publishing information.

Implementations of the terminal sending the obtaining request are as Manner 1 and Manner 2 shown in the foregoing operation S2. Details are not described herein again.

Operation 804: The server obtains the related information of the target object in response to that the obtaining request triggered by the terminal based on the object display operation is received.

The related information of the target object includes at least one of a picture, text information, a permission transfer link, or object interaction data of the target object.

Corresponding to two possible manners for the obtaining request in operation 803, operation 804 may include the following two implementations.

Manner 1: When the obtaining request is the first obtaining request, the server obtains the related information of the target object based on the outline feature of the target object carried in the first obtaining request.

In this operation, the server pre-stores an inverted index of a target database. The inverted index includes an index relationship between an outline feature and object information of each candidate object. The server may recognize, based on the outline feature of the target object, a target category to which the target object belongs, and determine at least one candidate object included in the target category in the target database. The server uses, based on the outline feature of the target object and the inverted index of the target database, an object having the outline feature of the target object in the at least one candidate object as the target object, and obtains the related information of the target object. The server may pre-store, by using the inverted index, an index relationship between the outline feature and an object identification and a correspondence between the object identification and the object information. In this case, the server may index, based on the inverted index, at least one candidate object that belongs to the target category to obtain an object identification having the outline feature of the target object. The server obtains the related information of the target object from the correspondence between the object identification and the object information based on the object identification. The server may perform feature similarity calculation on the outline feature of each candidate object in the inverted index based on the outline feature of the target object, and use a candidate object matching a pre-configured similarity condition after compared with outline feature similarity of the target object as the target object. In some embodiments, physical quantities such as an Euler distance and cosine similarity between two feature vectors may be calculated to indicate an outline similarity between two objects. In some embodiments, the pre-configured similarity condition may include but is not limited to that a pre-configured similarity is the greatest, that the similarity exceeds a specific similarity threshold, and the like.

Figure 9:
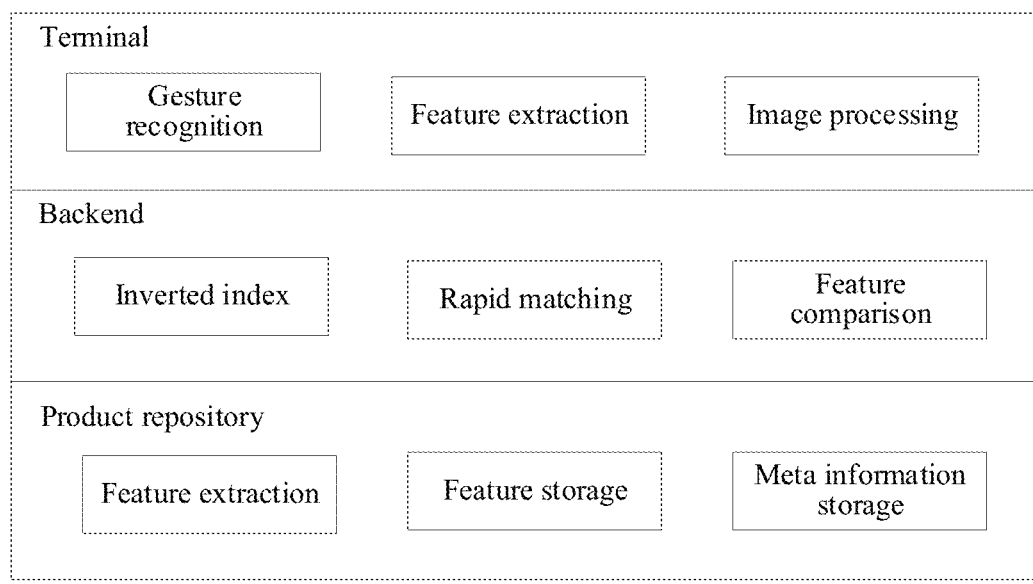
FIG. 9 is a schematic diagram of an overall architecture of a page display method according to some embodiments.

FIG. 9 is a schematic diagram of an overall architecture of a page display method according to some embodiments.

As shown in FIG. 9, the overall architecture includes three parts: a terminal part, a backend part, and a product repository part. For the terminal part, a terminal may be configured to: recognize an object display operation initiated by a video viewer; perform key frame extraction and image processing on a video frame corresponding to the object display operation, for example, extract an outline feature of a target object in an image (a key frame), where the outline feature may be a binary image indicating the outline feature; and upload the outline feature to a backend serving end. For the backend part, that is, a server, the server may be configured to: combine the outline feature uploaded by the terminal with an inverted index of the outline feature provided by the product repository; calculate an Euler distance between two outline features; determine according to a pre-configured similarity condition to obtain whether there is a corresponding a product of a same style or a similar product in the video frame triggered by the object display operation; and return the product to the terminal. For the product repository part, an inverted index is pre-constructed in the product repository based on a correspondence between the outline feature and a product ID. The outline feature is obtained by pre-performing feature extraction processing on product picture information in the product repository. The product repository pre-stores a correspondence between index information and meta information. The meta information may be at least one of a picture, text information, a permission transfer link, or object interaction data of the object.

Manner 2: When the obtaining request is the second obtaining request, the server obtains the related information of the target object based on the video publishing information carried in the second obtaining request.

The server may pre-store association information between the video publishing information and an object. In some embodiments, for a video product promotion scenario, the target video may be a video describing and promoting a product of a specific merchant, for example, a promotion video about a product of a cooperated merchant recorded by a video publisher. In some embodiments, a merchant may promote a product as a video publisher.

In some embodiments, operation 804 may include: The server determines a target object associated with the video publishing information from an association relationship between the video publishing information and an object based on the video publishing information of the target video, and obtains the related information of the target object. The video publishing information include at least one of information of a video publisher, a timestamp, or a video identification of the target video picture.

In some embodiments, in a case that one video is associated with one object, the server may obtain a target object associated with the video and related information based on the video identification.

In some embodiments, in a case that one video is associated with two or more objects, the server may determine a target object included in the target video picture from a plurality of objects associated with the video identification based on the video identification and the timestamp of the target video picture, and obtain related information of the target object.

In some embodiments, the server may determine, based on the video publisher information and the object identification, a target object corresponding to the object identification in at least one object associated with the video publisher. For a live commerce scenario, the server may record a plurality of products for promotion associated with a livestreamer (represented by a user identification on a live streaming platform) initiating a live streaming. When an audience initiate a product display operation at a live streaming page, the server may rapidly locate, based on a product ID, a product that the audience is interested in and that is in the plurality of products associated with the livestreamer.

In some embodiments, the server may pre-configure a database having a large amount of data such as related information, an outline feature, and video publishing information of an object. In this case, the server performs a related information obtaining operation corresponding to the foregoing Manner 1 or Manner 2. In some embodiments, the server may forward the obtaining request to a resource server. The resource server is configured to provide the related information of the target object. In this case, the resource server may obtain the related information by using the operations of Manner 1 or Manner 2 shown in the foregoing operation 804. The resource server returns the related information of the target object to the server. In some embodiments, the server may be a video application server or a social application server, and the resource server may be an e-commerce application server. In this case, the e-commerce application server provides product details information such as a picture, text information, and object comment data of a specific product to the video application server.

Operation 805: The server returns the related information of the target object to the terminal.

Operation 806: The terminal receives the related information of the target object returned by the server.

Operation 807: The terminal displays in a viewing angle display panel a view of the target object from at least one viewing angle based on the related information of the target object.

In some embodiments, the terminal displays in the viewing angle display panel a view of the target object from at least one viewing angle and at least one dimension of information of the target object based on the related information. In some embodiments, the at least one dimension of information includes at least one of text information, a permission transfer link, or object interaction data of the target object.

In some embodiments, if the object display operation includes a first display operation, the terminal may display in the viewing angle display panel a first view of the target object from a first viewing angle based on the first display operation. If the object display operation includes a second display operation, the terminal displays in the viewing angle display panel a process picture of the target object dynamically rotating from the first viewing angle to a second viewing angle and a second view of the target object from the second viewing angle. Certainly, the terminal may first slow down subsequent video pictures of the target video based on the object display operation and send an obtaining request to the server. When the related information returned by the server is received, the target video is paused by the terminal, and the terminal displays in the viewing angle display panel a view of the target object from at least one viewing angle.

Some embodiments of the terminal displaying in the viewing angle display panel the view from at least one viewing angle are described in the foregoing operation 202. Details are not described herein again.

Figure 10:
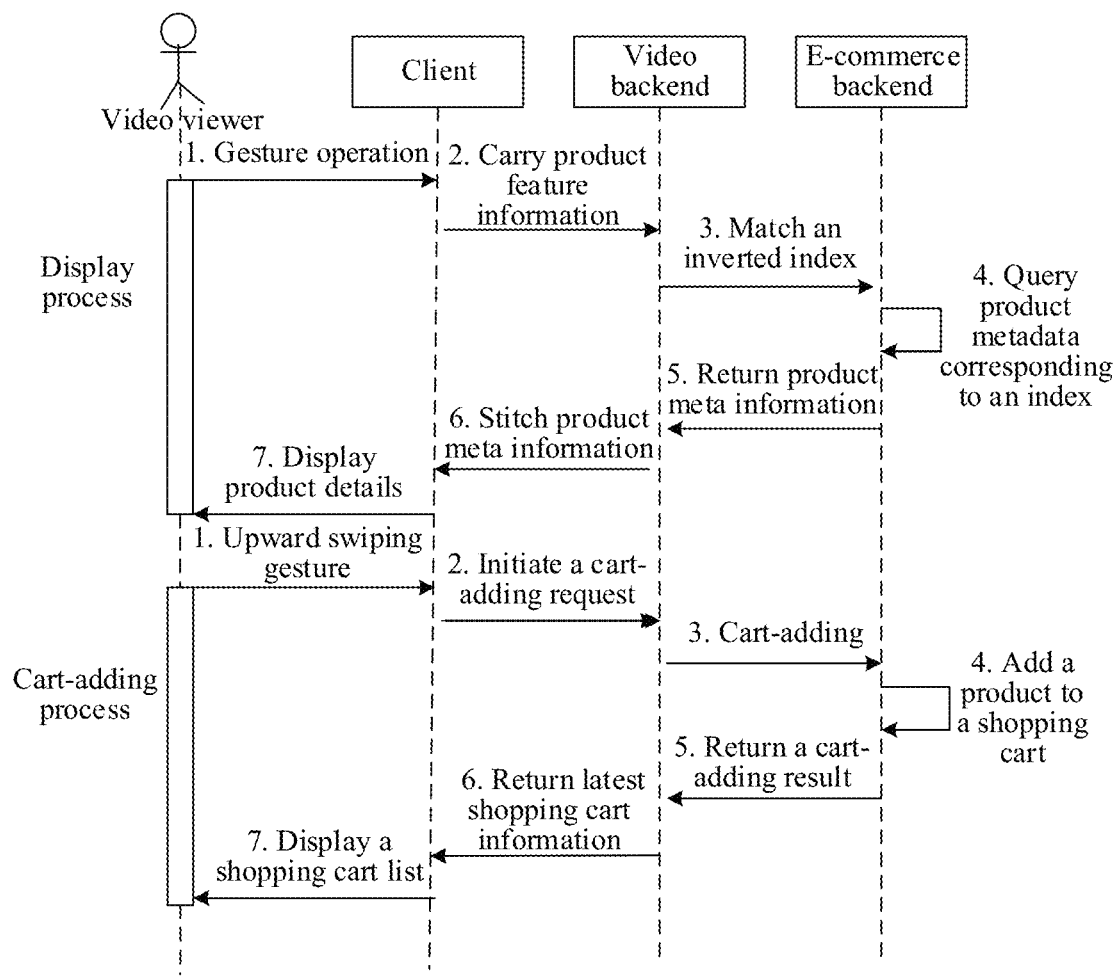
FIG. 10 is a block diagram of a technology of a page display process according to some embodiments.

FIG. 10 is a block diagram of a technology of a page display process according to some embodiments. As shown in FIG. 10, a resource server may be an e-commerce backend, and a server may be a video backend. The page display process may include a display process and a shopping cart-adding process for a product. For the display process, a video viewer triggers an object display operation via a gesture operation at a client of a video application, and the client may send an obtaining request carrying feature information of an outline feature of a product to the video backend. The video backend forwards the obtaining request to the e-commerce backend. The e-commerce backend determines a product ID having the outline feature based on an inverted index relationship between an outline feature pre-stored and a product ID, and obtains product metadata of the product ID, for example, information such as a product picture, a permission transfer link, text information, and object interaction data. The e-commerce backend returns product meta information to the video backend. The video backend performs stitching, encapsulation, and the like on each piece of product meta information, and returns a data packet having the product meta information encapsulated therein to the client, so that the client may display in a viewing angle display panel a panoramic view of the product and product details such as the text information, the permission transfer link, and the object interaction data.

As shown in FIG. 10, for the cart-adding process, the video viewer may trigger an upward swiping gesture operation in the viewing angle display panel, and if the upward swiping gesture is detected, the client initiates a cart-adding request for adding a product to a shopping cart to the video backend. The video backend forwards the cart-adding request to the e-commerce backend. The e-commerce backend adds the product to the shopping cart (for example, a virtual shopping cart function of an account of the video viewer on an e-commerce platform) of the video viewer, and returns a cart-adding result to the video backend. The cart-adding result may include updated latest shopping cart information. The video backend returns the latest shopping cart information to the client, and the client may display the latest shopping cart information.

In some embodiments, a video viewer may further trigger a collect operation on the target object in the viewing angle display panel. A collecting process for the target object may be implemented by interaction between the terminal and the server. An interaction process may include the following operation B1 to operation B3.

Operation B1: The terminal sends a collect request for the target object to the server in response to the collect operation on the target object.

The collect request may carry an object identification of the target object.

Operation B2: The server adds the target object in a favorites list corresponding to the terminal to obtain an updated favorites list and returns the updated favorites list to the terminal, in response to that the collect request of the terminal for the target object is received.

The updated favorites list includes at least the target object. The collect request is used for requesting to add the target object to the favorites list corresponding to the terminal. The terminal is a terminal at which the video viewer located. The favorites list corresponding to the terminal may be a favorites list of the video viewer, for example, an existing favorites list or a newly created favorites list of the video viewer. If the favorites list is an existing favorites list, the favorites list is used for indicating at least one collected historical object. If the favorites list is a newly created favorites list, the favorites list is an empty list.

In this operation, the server may determine the favorites list of the terminal based on the collect request, that is, the favorites list of the video viewer, and add the object identification of the target object to the favorites list, to obtain the updated favorites list. In some embodiments, the updated favorites list may include the object identification of the target object. In some embodiments, the server may add an object name and an object icon of the target object to the favorites list, to obtain the updated favorites list. The object icon may be a thumbnail of the object. In some embodiments, the updated favorites list may further include details information of the target object. In this case, the server adds the object identification and the details information of the target object to the favorites list, to obtain the updated favorites list. The details information may include but is not limited to an object permission transfer resource value, an object collection quantity, text description information of the object, object collecting time, and the like. The object permission transfer resource value refers to a resource value needed to perform permission transfer on the target object, such as a resource value needed to purchase a product A. The object collection quantity refers to a quantity of collected target objects. In some embodiments, if five products A are added to a shopping cart, the object collection quantity may be 5. The text description information of the object may be information describing a plurality of dimensions such as a color, a shape, a place of origin, and a size of the object. In some embodiments, a product A is a pair of blue shoes with a size 40. The object collecting time may be the time that the target object is added to the updated favorites list.

In some embodiments, if the target application supports the collect operation on the target object, for example, the server may pre-store a favorites list of each video viewer, the server directly adds the object identification of the target object to the favorites list of the video viewer. In some embodiments, the target application provides a purchasing service for a product. In this case, the server may directly add a target product to a shopping cart of the video viewer.

In some embodiments, the server may forward the collect request to a resource server. The resource server is configured to provide a collecting function for the target object. In this case, the resource server adds the object identification of the target object to the favorites list of the video viewer, and sends an obtained updated favorites list to the server. The server feeds back the updated favorites list to the terminal. In some embodiments, a video server sends a request for a shopping cart-adding operation of a video viewer to an e-commerce server. After performing a shopping cart-adding operation, the e-commerce server feeds back an updated shopping cart list to the video server. The video server returns the updated shopping cart list to a terminal.

Operation B3: The terminal receives the updated favorites list returned by the server, and displays the updated favorites list.

In some embodiments, the terminal may display the updated favorites list in the viewing angle display panel, or display the updated favorites list in an application page when the video viewer triggers a favorites list display operation. The updated favorites list may include a display list of information such as an object name, an object icon, and textual description information of each object, and an object permission transfer resource value, an object collecting quantity, textual description information of the object, and object collecting time. The object includes at least the target object.

In some embodiments, a video viewer may further trigger a permission transfer process for the target object in the viewing angle display panel. The permission transfer process for the target object may be implemented by interaction between the terminal and the server. An interaction process includes the following operation C1 to operation C3.

Operation C1: In response to a permission transfer operation on the target object, the terminal sends a permission transfer request corresponding to the permission transfer operation to the server.

The permission transfer request is used for obtaining a permission transfer page triggered correspondingly by the permission operation. In some embodiments, as shown in FIG. 5, a "details" button may be provided in the viewing angle display panel, and triggering the button may trigger the terminal to jump to a permission transfer page corresponding to the permission transfer link. The permission transfer page is used for initiating permission transfer of the target object. The permission transfer request may be used for obtaining the permission transfer page corresponding to the permission transfer link.

Operation C2: The server returns a permission transfer page of the target object to the terminal in response to that the permission transfer request of the terminal for the target object is received.

The server obtains the permission transfer page corresponding to the permission transfer link based on the permission transfer request. In some embodiments, the server may further forward the permission transfer request to a resource server, and receive a permission transfer page returned by the resource server.

Operation C3: The terminal jumps from the viewing angle display panel to display the permission transfer page of the target object.

In some embodiments, the terminal may jump from the viewing angle display panel to display a purchasing page of a target product.

In some embodiments, a video viewer may further cancel a multi-view displaying process for the target object in the viewing angle display panel. In some embodiments, a process of canceling the multi-view displaying may include: The terminal cancels displaying of the viewing angle display panel and continues to display the target video at a second playback speed, in response to a display cancellation operation triggered for the viewing angle display panel. In some embodiments, when the video viewer triggers a display cancellation operation in the viewing angle display panel, the terminal may revert the playback speed to a playback speed before the object display operation, to continue to play the target video.

In the page display method provided in some embodiments, related information of a target object is returned to a terminal based on an obtaining request of the terminal, so that when the terminal receives an object display operation triggered based on a target video picture, a view of the target object from at least one viewing angle is displayed in a viewing angle display panel, and the target object is an object included in the target video picture. In this way, an operation restriction of obtaining object information only from viewing an object in a video picture is removed, and the object in the video picture can be extracted and presented in different angles according to user operations, so as to provide an effective manner to browse the object, so that users can get what they see, thereby improving efficiency of displaying information of the object in the video picture and interaction efficiency of a user interface. In addition, each video picture in the target video includes at least one object, and a relationship between a video and a displayable object is not limited to one-to-one correspondence, so that a quantity of displayable objects of the video is increased, thereby improving information display efficiency of page display.

Figure 11:
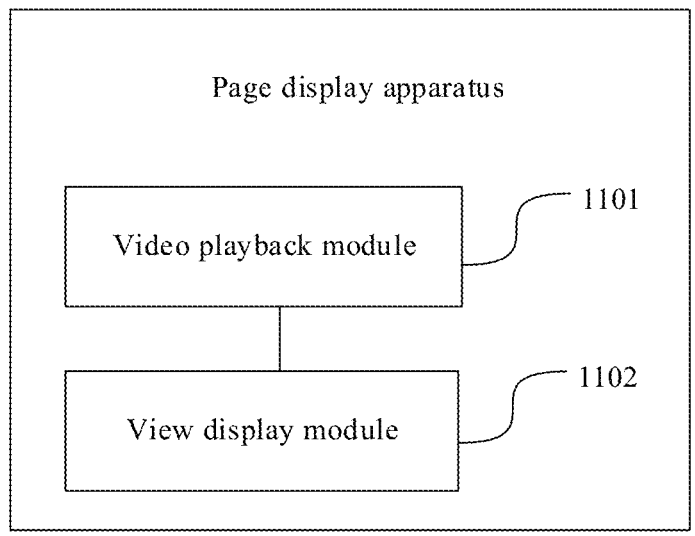
FIG. 11 is a schematic diagram of a structure of a page display apparatus according to some embodiments.

FIG. 11 is a schematic diagram of a structure of a page display apparatus according to some embodiments. As shown in FIG. 11, the apparatus includes:
   a video playback module 1101, configured to play a target video; and
   a view display module 1102, configured to: during the playing of the target video, display in a viewing angle display panel a view of a target object from at least one viewing angle in response to an object display operation triggered based on a target video picture of the target video, the target object being an object included in the target video picture, and a video picture of the target video including at least one object.

In some embodiments, the view display module 1102 is configured to: display in the viewing angle display panel a first view of the target object from a first viewing angle in response to a first display operation triggered based on the target video picture; and display in the viewing angle display panel a process picture of the target object dynamically rotating from the first viewing angle to a second viewing angle and a second view of the target object from the second viewing angle in response to a second display operation triggered based on the viewing angle display panel.

In some embodiments, the view display module 1102 is configured to: display a multi-view displaying guidance message in the target video picture, the multi-view displaying guidance message being used for guiding to trigger multi-view displaying of the target object; and display a view-changing guidance message in the viewing angle display panel, the view-changing guidance message being used for guiding the target object in rotating from a viewing angle to another viewing angle.

In some embodiments, the view display module 1102 is configured to: construct a three-dimensional space model of the target object based on a vertex position and texture data of the target object in a two-dimensional image in response to the object display operation, the two-dimensional image being the target video picture; and display in the viewing angle display panel a view of the three-dimensional space model from at least one viewing angle.

In some embodiments, the view display module 1102 is configured to: if the object display operation includes a first display operation triggered based on the target video picture, display in the viewing angle display panel a first view of the three-dimensional space model from a first viewing angle; and if the object display operation includes a second display operation triggered based on the viewing angle display panel, determine a conversion matrix based on the first view and a rotating angle and a moving distance of the second display operation, and display in the viewing angle display panel a process picture of the three-dimensional space model dynamically rotating from the first viewing angle to a second viewing angle and a second view of the three-dimensional space model from the second viewing angle based on the three-dimensional space model and the conversion matrix.

In some embodiments, the view display module 1102 is configured to display in the viewing angle display panel a first view of the target object from a first viewing angle based on coordinates of a vertex of the target object in the target video picture in response to the first display operation triggered based on the target video picture. The first viewing angle of the three-dimensional space model corresponds to the viewing angle of the target object in the target video picture.

In some embodiments, the view display module 1102 is configured to: play at least one frame of picture after the target video picture in the target video at a first playback speed in response to the object display operation, the first playback speed being less than a second playback speed during the playing of the target video picture; and in a process of playing the target video at the first playback speed, in response to that related information of the target object is obtained, stop playing the target video, and display in the viewing angle display panel a view of the target object from at least one viewing angle and at least one dimension of information of the target object based on the related information of the target object.

The at least one dimension of information includes at least one of text information, a permission transfer link, or object interaction data of the target object.

In some embodiments, the view display module 1102 is configured to perform any one of the following:

canceling displaying of the viewing angle display panel and continuing to play the target video at the second playback speed, in response to a display cancellation operation triggered on the viewing angle display panel;

sending a collect request for the target object to a server and displaying an updated favorites list returned by the server based on the collect request, in response to a collect operation on the target object, the updated favorites list including at least the target object; and jumping from the viewing angle display panel to display a permission transfer page of the target object in response to a permission transfer operation on the target object, the permission transfer page being used for initiating permission transfer of the target object.

In some embodiments, the view display module 1102 includes an obtaining unit. The obtaining unit is configured to perform any one of the following:

extracting an outline feature of the target object from the target video picture, sending a first obtaining request to a server based on the outline feature of the target object, and receiving the related information of the target object returned by the server based on the first obtaining request, the first obtaining request being used for obtaining related information of an object matching the outline feature;

sending a second obtaining request to the server based on video publishing information of the target video, and receiving the related information of the target object returned by the server based on the second obtaining request, the second obtaining request being used for obtaining related information of an object associated with the video publishing information; and obtaining the related information of the target object from a target storage address of a terminal based on a video identification of the target video.

In the page display apparatus provided in some embodiments, when a target video is played, if an object display operation triggered based on a target video picture is received, a view of a target object from at least one viewing angle is displayed in a viewing angle display panel, and the target object is an object included in the target video picture. In this way, an operation restriction of obtaining object information only from viewing an object in a video picture is removed, and the object in the video picture can be extracted and presented in different angles according to user operations, so as to provide an effective manner to browse the object, so that users to get what they see, thereby improving efficiency of displaying information of the object in the video picture and interaction efficiency of a user interface. In addition, each video picture in the target video includes at least one object, and a relationship between a video and a displayable object is not limited to one-to-one correspondence, so that a quantity of displayable objects of the video is increased, thereby improving information display efficiency of page display.

Figure 12:
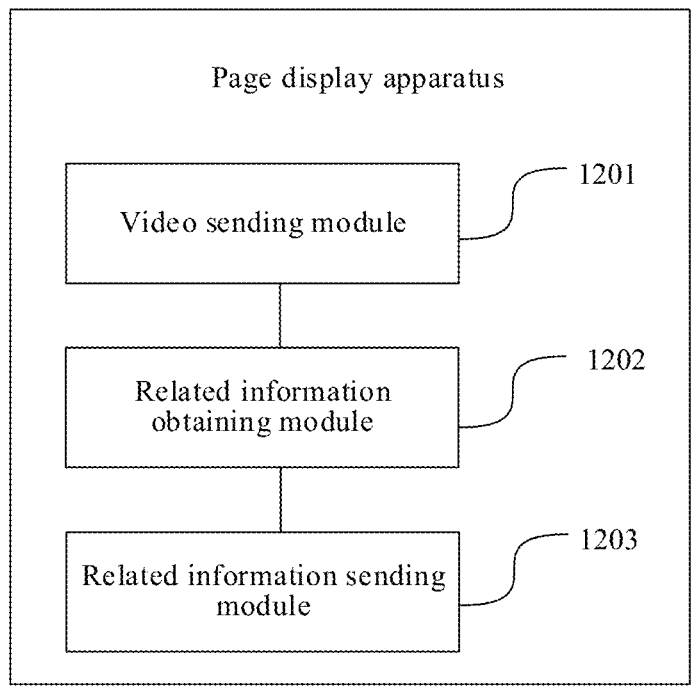
FIG. 12 is a schematic diagram of a structure of a page display apparatus according to some embodiments.

FIG. 12 is a schematic diagram of a structure of a page display apparatus according to some embodiments. As shown in FIG. 12, the apparatus includes:

a video sending module 1201, configured to send a target video to a terminal;

a related information obtaining module 1202, configured to obtain related information of a target object in response to that an obtaining request triggered by the terminal based on an object display operation is received, the object display operation being an operation triggered based on a target video picture of the target video, the target object being an object included in the target video picture, a video picture of the target video including at least one object, and the obtaining request being used for requesting to obtain the related information of the target object; and a related information sending module 1203, configured to return the related information of the target object to the terminal.

In some embodiments, the related information obtaining module 1202 is configured to: recognize, based on an outline feature of the target object, a target category to which the target object belongs; determine at least one candidate object included in the target category in a target database; and use, based on the outline feature of the target object and an inverted index of the target database, an object having the outline feature of the target object in the at least one candidate object as the target object, and obtain the related information of the target object. The inverted index includes an index relationship between an outline feature and object information of each candidate object.

In some embodiments, the related information obtaining module 1202 is configured to: determine a target object associated with video publishing information according to an association relationship between the video publishing information and an object based on video publishing information of the target video, and obtain the related information of the target object. The video publishing information includes at least one of information of a video publisher, a timestamp of the target video picture, or a video identification.

In some embodiments, the related information of the target object includes at least one of a picture, text information, a permission transfer link, or object interaction data of the target object.

In some embodiments, the apparatus further includes any one of the following:

a favorites list updating module, configured to: add the target object in a favorites list corresponding to the terminal to obtain an updated favorites list and return the updated favorites list to the terminal, in response to that a collect request of the terminal for the target object is received; and a permission transfer page returning module, configured to return a permission transfer page of the target object to the terminal in response to that a permission transfer request of the terminal for the target object is received. The permission transfer page is used for initiating permission transfer of the target object.

A person skilled in the art would understand that the above "modules" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module. In other words, the foregoing modules may be implemented in a form of hardware, or may be implemented in a form of instructions in a form of software, or may be implemented in a form of a combination of software and hardware.

In the page display apparatus provided in some embodiments, related information of a target object is returned to a terminal based on an obtaining request of the terminal, so that when the terminal receives an object display operation triggered based on a target video picture, a view of the target object from at least one viewing angle may be displayed in a viewing angle display panel, and the target object is an object included in the target video picture. In this way, an operation restriction of obtaining object information only from viewing an object in a video picture is removed, and the object in the video picture can be extracted and presented in different angles according to user operations, so as to provide an effective manner to browse the object, so that users can get what they see, thereby improving efficiency of displaying information of the object in the video picture and interaction efficiency of a user interface. In addition, each video picture in the target video includes at least one object, and a relationship between a video and a displayable object is not limited to one-to-one correspondence, so that a quantity of displayable objects of the video is increased, thereby improving information display efficiency of page display.

The apparatus in some embodiments can perform the method provided in the embodiments, and the implementation principles of the apparatus and the method are similar. The actions performed by the modules of the apparatus in the embodiments correspond to the operations in the method in the embodiments. For detailed descriptions for functions of the modules of the apparatus, reference may be made in particular to the descriptions of the corresponding method shown in the foregoing descriptions, and details are not described herein again.

Figure 13:
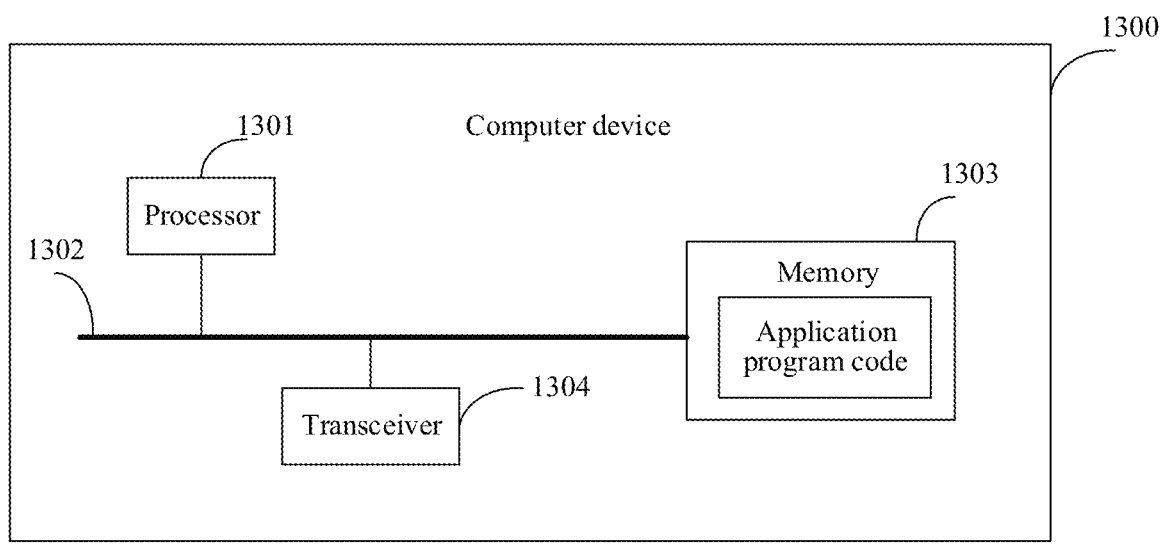
FIG. 13 is a schematic diagram of a structure of a computer device according to some embodiments.

FIG. 13 is a schematic diagram of a structure of a computer device according to some embodiments. As shown in FIG. 13, the computer device includes a memory, a processor, and a computer program stored in the memory. The processor executes the computer program to implement operations of the page display method. Compared with related technologies, the method may implement the following:

In the page display method provided in some embodiments, when a target video is played, if an object display operation triggered based on a target video picture is received, a view of a target object from at least one viewing angle is displayed in a viewing angle display panel, and the target object is an object included in the target video picture. In this way, an operation restriction of obtaining object information only from viewing an object in a video picture is removed, and the object in the video picture can be extracted and presented in different angles according to user operations, so as to provide an effective manner to browse the object, so that users can get what they see, thereby improving efficiency of displaying information of the object in the video picture and interaction efficiency of a user interface. In addition, each video picture in the target video includes at least one object, and a relationship between a video and a displayable object is not limited to one-to-one correspondence, so that a quantity of displayable objects of the video is increased, thereby improving information display efficiency of page display.

In the page display method provided in some embodiments, related information of a target object is returned to a terminal based on an obtaining request of the terminal, so that when the terminal receives an object display operation triggered based on a target video picture, a view of the target object from at least one viewing angle is displayed in a viewing angle display panel, and the target object is an object included in the target video picture. In this way, an operation restriction of obtaining object information only from viewing an object in a video picture is removed, and the object in the video picture can be extracted and presented in different angles according to user operations, so as to provide an effective manner to browse the object, so that users can get what they see, thereby improving efficiency of displaying information of the object in the video picture and interaction efficiency of a user interface. In addition, each video picture in the target video includes at least one object, and a relationship between a video and a displayable object is not limited to one-to-one correspondence, so that a quantity of displayable objects of the video is increased, thereby improving information display efficiency of page display.

In some embodiments, a computer device is provided. As shown in FIG. 13, the computer device 1300 includes a processor 1301 and a memory 1303. The processor 1301 is connected to the memory 1303, for example, through a bus 1302. In some embodiments, the computer device 1300 may further include a transceiver 1304. The transceiver 1304 may be configured to exchange data, for example, send data and receive data, between the computer device and other computer device. In some embodiments, a quantity of the transceiver 1304 is not limited to one, and a structure of the computer device 1300 does not constitute a limitation on the embodiments.

The processor 1301 may be a central processing unit (CPU), a general-purpose processor, a digital signal processor (DSP), an application specific integrated circuit (ASIC), a field programmable gate array (FPGA) or another programmable logic device, a transistor logic device, a hardware component, or a combination thereof. The processor 1301 may implement or perform various example logical blocks, modules, and circuits described with reference to content disclosed in some embodiments. In some embodiments, the processor 1301 may be a combination for implementing computing functions, for example, a combination of one or more microprocessors, or a combination of a DSP and a microprocessor.

The bus 1302 may include a path for transmitting information between the foregoing components. The bus 1302 may be a peripheral component interconnect (PCI) bus, an extended industry standard architecture (EISA) bus, or the like. The bus 1302 may include an address bus, a data bus, a control bus, or the like. For ease of representation, only one bold line is used to represent the bus in FIG. 13, but this does not mean that there is only one bus or only one type of bus.

The memory 1303 may be a read only memory (ROM) or a static storage device of another type that can store static information and instructions, a random access memory (RAM) or a dynamic storage device of another type that can store information and instructions, or may be an electrically erasable programmable read only memory (EEPROM), a compact disc read only memory (CD-ROM) or another compact disc storage, an optical disc storage (including a compressed optical disc, a laser disc, an optical disc, a digital versatile disc, a blue-ray optical disc, and the like), a magnetic disk storage medium or another magnetic storage device, or any other medium that can be used to carry or store computer programs and can be read by a computer, which is not limited herein.

The memory 1303 is configured to store the computer program that executes the embodiments and that is controlled and executed by the processor 1301. The processor 1301 is configured to execute the computer program stored in the memory 1303 to implement the operations in the foregoing method embodiments.

The electronic device includes but is not limited to a server, a terminal, a cloud computing center device, or the like.

Some embodiments provide a computer-readable storage medium having a computer program stored thereon, and when the computer program is executed by a processor, operations and corresponding content of the foregoing method embodiments may be implemented.

Some embodiments provide a computer program product including a computer program, and when the computer program is executed by a processor, operations and corresponding content of the foregoing method embodiments may be implemented.

A person skilled in the art may understand that the singular forms "a/an", "one", "said" and "the" used herein may also include the plural forms, unless otherwise expressly stated. The terms such as "comprise" and "include" used in the embodiments means that corresponding features may be implemented as the presented features, information, data, operations, and operations, but do not exclude the implementations of other features, information, data, operations, and operations that are supported by the technical field.

The terms such as "first", "second", "third", "fourth", "1" and "2" (if any) in the specification and claims of the disclosure and in the accompanying drawings are used for distinguishing between similar objects, but are not necessarily used for describing a particular order or sequence. Such used data is interchangeable in appropriate circumstances, so that the embodiments described herein can be implemented in an order other than the order illustrated or described herein.

Although the operations are indicated by the arrows in the flowcharts herein, the order in which these operations are performed is not limited to the order indicated by the arrows. Unless explicitly stated herein, in some embodiments, the implementation operations in the flowcharts may be performed in other orders according to requirements. In addition, some or all of the operations in the flowcharts may include a plurality of sub-operations or a plurality of stages based on actual implementation scenarios. Some or all of these sub-operations or stages may be performed at the same, and each of the sub-operations or stages may be performed at different moments respectively. In scenarios with different executed moments, the order of execution of these sub-operations or stages may be flexibly configured according to requirements, which is not limited herein.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A page display method, performed by a computer device, comprising:
   playing a target video; and
   during the playing of the target video, displaying, in a viewing angle display panel, a view of a target object from at least one viewing angle based on an object display operation being triggered based on a target video picture of the target video, the target object being an object comprised in the target video picture, and a video picture of the target video comprising at least one object,
   wherein the displaying comprises:
   constructing a three-dimensional space model of the target object based on a vertex position and texture data of the target object in a two-dimensional image based on the object display operation, the two-dimensional image being the target video picture;
   displaying, in the viewing angle display panel, a first view of the three-dimensional space model from a first viewing angle based on the object display operation comprising a first display operation triggered based on the target video picture; and
   determining a conversion matrix based on the first view, a rotating angle of the second display operation, and a moving distance of the second display operation and
   displaying, in the viewing angle display panel, a process picture of the three-dimensional space model dynamically rotating from the first viewing angle to a second viewing angle and a second view of the three-dimensional space model from the second viewing angle based on the three-dimensional space model and the conversion matrix, based on the object display operation comprising a second display operation triggered based on the viewing angle display panel.

2. The page display method according to claim 1, wherein the displaying comprises:
   displaying, in the viewing angle display panel, a first view of the target object from a first viewing angle based on a first display operation being triggered based on the target video picture; and
   displaying, in the viewing angle display panel, a process picture of the target object dynamically rotating from the first viewing angle to a second viewing angle and a second view of the target object from the second viewing angle based on a second display operation being triggered based on the viewing angle display panel.

3. The page display method according to claim 2, further comprising:
   displaying a multi-view displaying guidance message in the target video picture, the multi-view displaying guidance message guiding to trigger multi-view displaying of the target object; and
   displaying a view-changing guidance message in the viewing angle display panel, the view-changing guidance message guiding the target object in rotating from one viewing angle to another viewing angle.

4. The page display method according to claim 1, wherein the first view of the target object from the first viewing angle is displayed in the viewing angle display panel based on coordinates of a vertex of the target object in the target video picture based on the first display operation being triggered based on the target video picture, and the first viewing angle of the three-dimensional space model corresponds to the viewing angle of the target object in the target video picture.

5. The page display method according to claim 1, wherein the displaying comprises:
   playing at least one frame of picture after the target video picture in the target video at a first playback speed based on the object display operation, the first playback speed being less than a second playback speed during the playing of the target video picture; and
   in a process of playing the target video at the first playback speed, based on related information of the target object being obtained, stopping playing the target video, and displaying, in the viewing angle display panel, the view of the target object from the at least one viewing angle and at least one dimension of information of the target object based on the related information of the target object,
   the at least one dimension of information comprising at least one of text information, a permission transfer link, or object interaction data of the target object.

6. The page display method according to claim 5, wherein after the displaying, the method further comprises any one of the following:
   canceling displaying of the viewing angle display panel and continuing to play the target video at the second playback speed, based on a display cancellation operation being triggered on the viewing angle display panel;
   sending a collect request for the target object to a server and displaying an updated favorites list returned by the server based on the collect request, based on a collect operation on the target object, the updated favorites list comprising at least the target object; and
   jumping from the viewing angle display panel to display a permission transfer page of the target object based on a permission transfer operation on the target object, the permission transfer page initiating permission transfer of the target object.

7. The page display method according to claim 5, wherein an obtaining manner of the related information of the target object comprises any one of the following:
   extracting an outline feature of the target object from the target video picture, sending a first obtaining request to a server based on the outline feature of the target object, and receiving the related information of the target object returned by the server based on the first obtaining request, the first obtaining request obtaining related information of an object matching the outline feature;
   sending a second obtaining request to the server based on video publishing information of the target video, and receiving the related information of the target object returned by the server based on the second obtaining request, the second obtaining request obtaining related information of an object associated with the video publishing information; and
   obtaining the related information of the target object from a target storage address of a terminal based on a video identification of the target video.

8. A page display apparatus, the apparatus comprising:
   at least one memory configured to store program code; and
   at least one processor configured to read the program code and operate as instructed by the program code, the program code comprising:
   video playback code configured to cause at least one of the at least one processor to play a target video; and
   view display code configured to cause at least one of the at least one processor to:
   during the playing of the target video, display, in a viewing angle display panel, a view of a target object from at least one viewing angle in response to an object display operation triggered based on a target video picture of the target video, the target object being an object comprised in the target video picture, and a video picture of the target video comprising at least one object,
   wherein the view display code is further configured to cause at least one of the at least one processor to:
   construct a three-dimensional space model of the target object based on a vertex position and texture data of the target object in a two-dimensional image based on the object display operation, the two-dimensional image being the target video picture; and
   display, in the viewing angle display panel, a view of the three-dimensional space model from the at least one viewing angle,
   display, in the viewing angle display panel, a first view of the three-dimensional space model from a first viewing angle based on the object display operation comprising a first display operation triggered based on the target video picture; and
   determine a conversion matrix based on the first view, a rotating angle of the second display operation, and a moving distance of the second display operation and
   displaying, in the viewing angle display panel, a process picture of the three-dimensional space model dynamically rotating from the first viewing angle to a second viewing angle and a second view of the three-dimensional space model from the second viewing angle based on the three-dimensional space model and the conversion matrix, based on the object display operation comprising a second display operation triggered based on the viewing angle display panel.

9. The page display apparatus according to claim 8, wherein the view display code is further configured to cause at least one of the at least one processor to:
   display, in the viewing angle display panel, a first view of the target object from a first viewing angle based on a first display operation being triggered based on the target video picture; and
   display, in the viewing angle display panel, a process picture of the target object dynamically rotating from the first viewing angle to a second viewing angle and a second view of the target object from the second viewing angle based on a second display operation being triggered based on the viewing angle display panel.

10. The page display apparatus according to claim 9, wherein the view display code is further configured to cause at least one of the at least one processor to:
   display a multi-view displaying guidance message in the target video picture, the multi-view displaying guidance message guiding to trigger multi-view displaying of the target object; and
   display a view-changing guidance message in the viewing angle display panel, the view-changing guidance message guiding the target object in rotating from one viewing angle to another viewing angle.

11. The page display apparatus according to claim 8, wherein the view display code is further configured to cause at least one of the at least one processor to: display, in the viewing angle display panel, based on coordinates of a vertex of the target object in the target video picture based on the first display operation being triggered based on the target video picture, and the first viewing angle of the three-dimensional space model corresponds to the viewing angle of the target object in the target video picture.

12. The page display apparatus according to claim 8, wherein the view display code is further configured to cause at least one of the at least one processor to:
    playing at least one frame of picture after the target video picture in the target video at a first playback speed based on the object display operation, the first playback speed being less than a second playback speed during the playing of the target video picture; and
    in a process of playing the target video at the first playback speed, based on related information of the target object being obtained, stopping playing the target video, and displaying, in the viewing angle display panel, the view of the target object from the at least one viewing angle and at least one dimension of information of the target object based on the related information of the target object,
    the at least one dimension of information comprising at least one of text information, a permission transfer link, or object interaction data of the target object.

13. The page display apparatus according to claim 12, wherein the view display code is further configured to cause at least one of the at least one processor to perform any one of the following:
    canceling displaying of the viewing angle display panel and continuing to play the target video at the second playback speed, based on a display cancellation operation being triggered on the viewing angle display panel;
    sending a collect request for the target object to a server and displaying an updated favorites list returned by the server based on the collect request, based on a collect operation on the target object, the updated favorites list comprising at least the target object; and
    jumping from the viewing angle display panel to display a permission transfer page of the target object based on a permission transfer operation on the target object, the permission transfer page initiating permission transfer of the target object.

14. The page display apparatus according to claim 12, wherein the program code further comprises obtaining code configured to cause at least one of the at least one processor to perform any one of the following:
    extracting an outline feature of the target object from the target video picture, sending a first obtaining request to a server based on the outline feature of the target object, and receiving the related information of the target object returned by the server based on the first obtaining request, the first obtaining request obtaining related information of an object matching the outline feature;
    sending a second obtaining request to the server based on video publishing information of the target video, and receiving the related information of the target object returned by the server based on the second obtaining request, the second obtaining request obtaining related information of an object associated with the video publishing information; and
    obtaining the related information of the target object from a target storage address of a terminal based on a video identification of the target video.

15. A non-transitory computer-readable storage medium storing computer code which, when executed by at least one processor, causes the at least one processor to at least:
    play a target video; and
    during the playing of the target video, display, in a viewing angle display panel, a view of a target object from at least one viewing angle based on an object display operation being triggered based on a target video picture of the target video, the target object being an object comprised in the target video picture, and a video picture of the target video comprising at least one object,
    wherein the displaying comprises:
    constructing a three-dimensional space model of the target object based on a vertex position and texture data of the target object in a two-dimensional image based on the object display operation, the two-dimensional image being the target video picture;
    displaying, in the viewing angle display panel, a first view of the three-dimensional space model from a first viewing angle based on the object display operation comprising a first display operation triggered based on the target video picture; and
    determining a conversion matrix based on the first view, a rotating angle of the second display operation, and a moving distance of the second display operation and
    displaying, in the viewing angle display panel, a process picture of the three-dimensional space model dynamically rotating from the first viewing angle to a second viewing angle and a second view of the three-dimensional space model from the second viewing angle based on the three-dimensional space model and the conversion matrix, based on the object display operation comprising a second display operation triggered based on the viewing angle display panel.

16. The non-transitory computer-readable storage medium according to claim 15, wherein the display comprises:
    displaying, in the viewing angle display panel, a first view of the target object from a first viewing angle based on a first display operation being triggered based on the target video picture; and
    displaying, in the viewing angle display panel, a process picture of the target object dynamically rotating from the first viewing angle to a second viewing angle and a second view of the target object from the second viewing angle based on a second display operation being triggered based on the viewing angle display panel.

* * * * *